(12) United States Patent  
Cravener et al.

(10) Patent No.: US 12,534,186 B2  
(45) Date of Patent: Jan. 27, 2026

(54) FOLD-LOCK AND PITCH-LOCK SYSTEMS

(71) Applicant: Textron Innovations Inc., Providence, RI (US)

(72) Inventors: Kyle Cravener, Arlington, TX (US); Andrew Harloff, Fort Worth, TX (US); Lancer Drake Halcom, Coppell, TX (US); Andrew Maresh, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 18/472,897

(22) Filed: Sep. 22, 2023

(65) Prior Publication Data

US 2025/0100674 A1 Mar. 27, 2025

(51) Int. Cl.
*B64C 11/28* (2006.01)
*B64C 29/00* (2006.01)

(52) U.S. Cl.
CPC .......... *B64C 11/28* (2013.01); *B64C 29/0033* (2013.01)

(58) Field of Classification Search
CPC ......... B64C 11/16; B64C 11/20; B64C 11/28; B64C 27/50; B64C 29/0016; B64C 29/0033
See application file for complete search history.

(56) References Cited

U.S. PATENT DOCUMENTS

| | | | | |
|---|---|---|---|---|
| 5,031,858 | A | * | 7/1991 | Schellhase .............. B64C 27/50 416/142 |
| 6,032,899 | A | * | 3/2000 | Mondet .................. B64C 27/50 416/142 |
| 2019/0352002 | A1 | * | 11/2019 | Schulte ................... B64C 27/57 |
| 2021/0114714 | A1 | * | 4/2021 | Tsai .......................... B64C 9/06 |
| 2021/0362837 | A1 | * | 11/2021 | Cravener ............... B64C 11/28 |

* cited by examiner

*Primary Examiner* — Elton K Wong
(74) *Attorney, Agent, or Firm* — Lightfoot & Alford PLLC

(57) ABSTRACT

A rotor-blade assembly has a lock system to enable and disable a folding degree of freedom and a pitching degree of freedom of a rotor blade. A grip couples a blade to a hub, the blade being pivotable about a fold axis relative to the grip, the blade and grip being pivotable together about a pitch axis relative to the hub. A fold lock prevents folding of the blade in a fold-lock position and allows folding of the rotor blade in a pitch-lock position, and a pitch lock allows pitch movement of the rotor blade in a fold-lock position and prevents pitch movement of the rotor blade in the pitch-lock position. A rotary actuator carried by the grip has actuator arms coupled through linkage to the pitch lock and fold lock, and the actuator is configured for moving the pitch lock and fold lock between the fold-lock and pitch-lock positions.

20 Claims, 31 Drawing Sheets

FOLD-LOCK AND PITCH-LOCK SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Fixed-wing aircraft, such as airplanes, are capable of flight using wings that generate lift in response to the forward airspeed of the aircraft. The forward airspeed is generated by thrust from one or more jet engines or propellers. The wings generally have an airfoil cross section that generates lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering, and landing vertically. One example of a VTOL aircraft is a helicopter, which is a rotorcraft having one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically mounted near the ends of a fixed wing. The proprotors are pivotable relative to the fixed wing such that the proprotors have a generally horizontal plane of rotation for vertical takeoff, hovering and landing and a generally vertical plane of rotation while cruising in forward flight, wherein the fixed wing provides lift and the proprotors provide forward thrust. In this manner, tiltrotor aircraft combine the vertical lift capability of a helicopter with the speed and range of fixed-wing aircraft.

Tiltrotor aircraft are hybrids between traditional helicopters and traditional propeller driven aircraft. During airplane mode of the tiltrotor, forward speed and range is limited by certain fundamental limitations of the rotor systems.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

This disclosure divulges mechanisms for controlling the ability of rotor blades to pivot about a pitch axis and a folding axis, thereby allowing transitioning a tiltrotor aircraft between rotary and non-rotary flight modes.

Figure 1A:
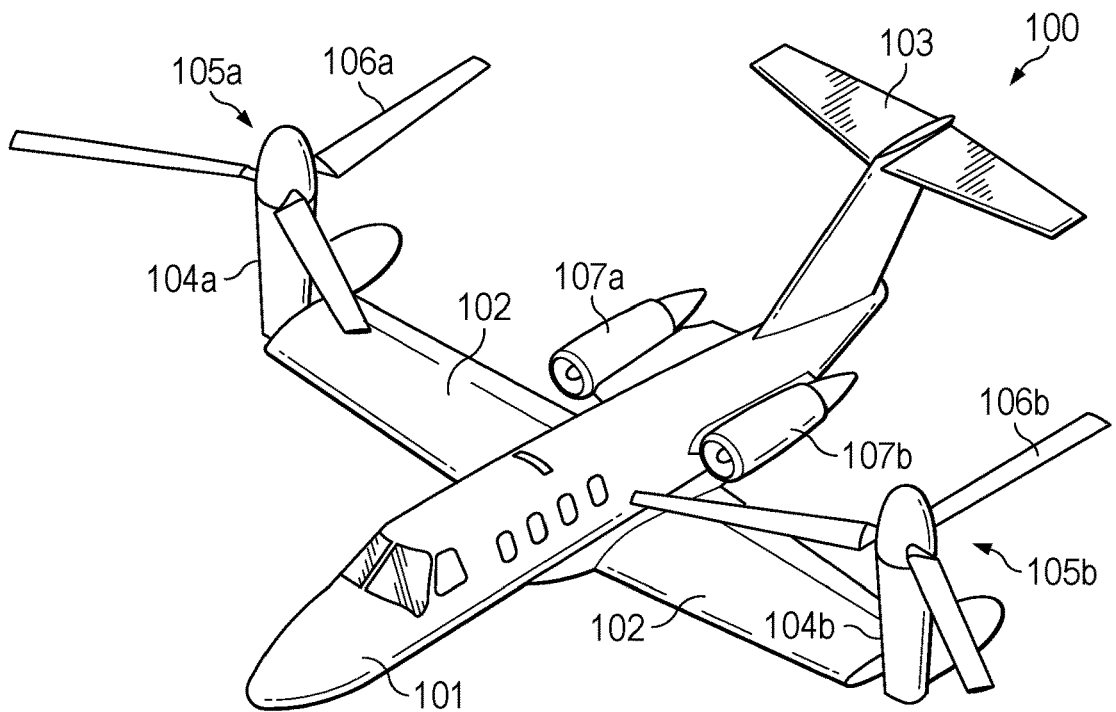
FIGS. 1A-1C illustrate a tiltrotor aircraft in various rotary and non-rotary flight modes.
Figure 1B:
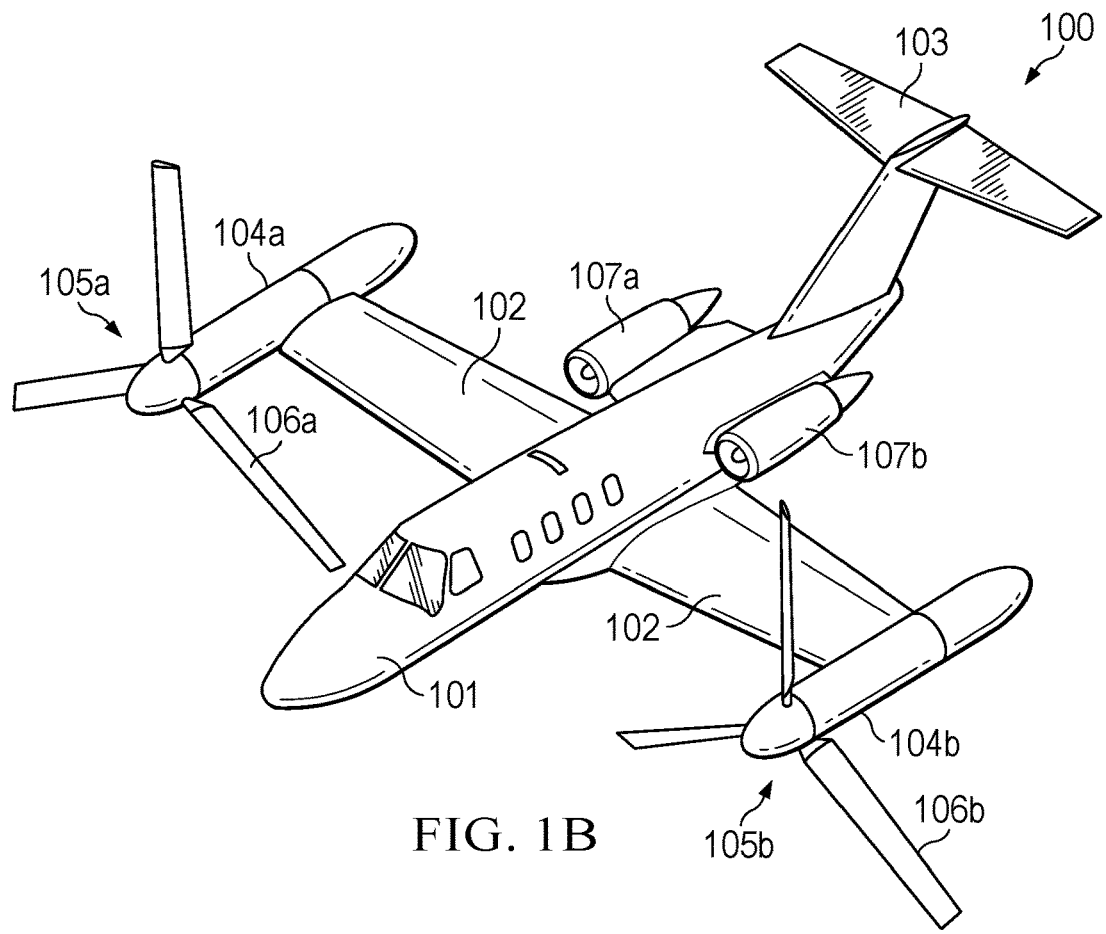
Figure 1C:
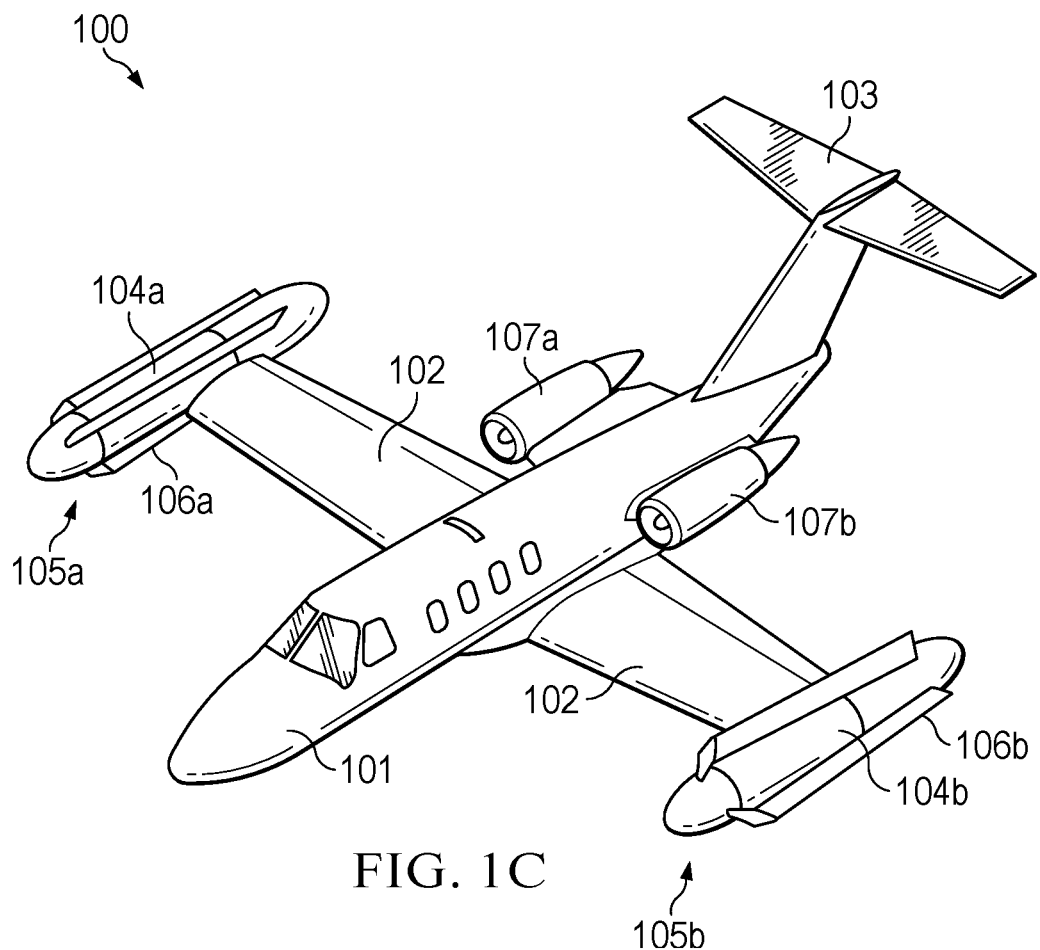

Referring to FIGS. 1A-1C, a tiltrotor aircraft is schematically illustrated and generally designated 100. Tiltrotor aircraft 100 includes a fuselage 101, wings 102 and tail assembly 103. Wings 102 and tail assembly 103 may include control surfaces, such as ailerons, flaps, slats, spoilers, elevators, rudders, or ruddervators, operable for horizontal and/or vertical stabilization during forward flight. Pylon assemblies 104a, 104b are located at the outboard ends of wing 102 and are rotatable relative to wings 102 between a generally vertical orientation, as best seen in FIG. 1A, and a generally horizontal orientation, as best seen in FIGS. 1B-1C. Pylon assemblies 104a, 104b may comprise a fixed portion that is attached to wing 102 and a moveable portion that rotates or pivots relative to wing 102 as illustrated in FIG. 1A. In other embodiments, the entire pylon assembly 104a, 104b may rotate relative to wing 102.

Pylon assemblies 104a, 104b each house a portion of a drive system that is used to rotate proprotor assemblies 105a, 105b, respectively. The drive system may comprise, for example, a lift engine within fuselage 101 that is coupled to each of the proprotor assemblies 105a, 105b via linkages in wing 102 and pylon assemblies 104a, 104b. Each proprotor assembly 105a, 105b includes a plurality of proprotor blades 106a, 106b that are operable to be rotated, operable to be feathered, and operable to be folded. In other embodiments, pylon assemblies 104a, 104b may comprise engines that are configured to drive respective proprotor assemblies 105a, 105b.

FIG. 1A illustrates tiltrotor aircraft 100 in VTOL or helicopter flight mode, in which pylons 104a, 104b are configured in a vertical position and proprotor blades 106a, 106b rotate in a substantially horizontal plane to provide a lifting thrust, such that tiltrotor aircraft 100 flies much like a conventional helicopter.

FIG. 1B illustrates tiltrotor aircraft 100 in a forward flight mode, in which pylons 104a, 104b have been rotated forward to a horizontal position so that proprotor blades 106a, 106b are rotating in a substantially vertical plane to provide a forward thrust, thereby enabling wings 102 to provide a lifting force responsive to forward airspeed, such that tiltrotor aircraft 100 flies much like a conventional propeller driven aircraft.

In the rotary flight modes, proprotor assemblies 105a, 105b rotate in opposite directions to provide torque balancing to tiltrotor aircraft 100. For example, when viewed from the front of tiltrotor aircraft 100 in proprotor forward flight mode (FIG. 1B) or from the top in helicpter mode (FIG. 1A), proprotor assembly 105a may rotate clockwise, for example, and proprotor assembly 105b may rotate counterclockwise. In the illustrated embodiment, proprotor assemblies 105a, 105b each include three proprotor blades 106a, 106b that are equally spaced apart circumferentially at approximately 120-degree intervals. It should be understood by those having ordinary skill in the art, however, that the proprotor assemblies 105a, 105b of the present disclosure may have proprotor blades with other designs and other configurations including, for example, proprotor assemblies having two, four, five or more proprotor blades. In addition, it should be appreciated that tiltrotor aircraft 100 can be operated such that proprotor assemblies 105a, 105b are selectively positioned between proprotor forward flight mode and helicopter mode, which can be referred to as a conversion flight mode.

While in the configuration illustrated in FIG. 1B, tiltrotor aircraft 100 may transition between a proprotor-driven forward-flight mode and a thrust-driven forward-flight mode (referred to herein as "jet mode"). The thrust engine may be, for example, turbojet engines 107a, 107b that are mounted on fuselage 101. The thrust engine may be engaged to initially supplement the forward thrust of proprotor assemblies 105a, 105b. The lift engine may then be disengaged from proprotor assemblies 105a, 105b so that the thrust engines 107a, 107b provide all of the forward thrust for tiltrotor aircraft 100. The proprotor blades 106a, 106b on proprotor assemblies 105a, 105b are then feathered (i.e., oriented to be streamlined in the direction of flight). In the feathered position, the proprotor blades 106a, 106b may act as brakes to aerodynamically stop the rotation of proprotor assemblies 105a, 105b.

FIG. 1C illustrates tiltrotor aircraft 100 in airplane forward flight mode, in which proprotor blades 106a, 106b have been folded so that they are oriented substantially parallel to respective pylon assemblies 104a, 104b. This configuration minimizes the drag force generated by proprotor blades 106a, 106b during jet-mode flight. The forward cruising speed of tiltrotor aircraft 100 can be significantly higher in a thrust-driven airplane flight mode versus proprotor flight mode by reducing any airspeed-induced proprotor aeroelastic instability. In this configuration, the thrust engines 107a, 107b provide forward thrust for tiltrotor aircraft 100, thereby enabling wings 102 to provide a lifting force responsive to the forward airspeed. Apparatus for folding rotor blades on a stop-fold aircraft are disclosed, for example, in U.S. Pat. No. 8,998,125 B2, U.S. Pat. No. 10,336,447 B2, U.S. Pat. No. 10,526,068 B2, U.S. Pat. No. 11,511,848 B2, and U.S. Pat. App. Pub. 2023/0101186 A1, the disclosures of which are hereby incorporated herein by reference in their entirety.

Tiltrotor aircraft 100 may also transition from the folded proprotor blade configuration of FIG. 1C back to proprotor flight by slowing below a maximum airspeed for proprotor deployment. Proprotor blades 106a, 106b may then be swept forward into a feathered configuration. Once all proprotor blades are deployed forward and locked into place (as illustrated in FIG. 1B), then the lift engine may again engage proprotor assemblies 105a, 105b. When torque power is applied to rotate proprotor blades 106a, 106b, tiltrotor aircraft 100 enters proprotor forward-flight mode. Tiltrotor aircraft 100 may then transition to a conversion flight mode and/or helicopter flight mode by rotating proprotor assembly 105a, 105b on pylon assemblies 104a, 104b from a horizontal orientation (FIG. 1B) to a vertical orientation (FIG. 1A).

A flight control computer (FCC) may be incorporated into tiltrotor aircraft 100 and may be configured to control and communicate with various systems including, for example, proprotor blade control systems in proprotor assembly 105a, 105b. The proprotor blade control systems may be communicably coupled to the FCC and may provide closed-loop control of controllable elements located within the proprotor assemblies 105a, 105b. The controllable elements within the proprotor assemblies 105a, 105b may include any structural feature operable to move and/or effect change such as, for example, blade locks, a gimbal lock, trailing-edge flaps, twistable blades, independently controllable elements attached or connected to blades, combinations of the foregoing and/or the like.

The proprotor blade control systems may include, for example, actuators that control motion of the controllable elements in the proprotor assemblies 105a, 105b, sensors that provide position feedback data related to the controllable elements, and control computers that operate the actuators, for example, by transmitting control signals to the actuators. The FCC and the proprotor blade control systems may collaboratively provide a variety of redundant control methods relative to the controllable elements in the proprotor assemblies 105a, 105b.

Although tiltrotor aircraft 100 has been described as having an internal lift engine and separate external thrust engines 107a, 107b, wherein the lift engine may operate both of the proprotor assemblies in rotary flight mode, it should be understood by those having ordinary skill in the art that other engine arrangements are possible and are considered to be within the scope of the present disclosure. For example, in an alternative embodiment, tiltrotor aircraft 100 may have multiple lift engines that provide torque and rotational energy separately to proprotor assemblies 105a, 105b. In addition, even though proprotor assemblies 105a, 105b are illustrated in the context of tiltrotor aircraft 100, it should be understood by those having ordinary skill in the art that the proprotor assemblies disclosed herein can be implemented on other tiltrotor aircraft having multiple wing members 102 and other proprotor assembly configurations. In other embodiments, the thrust engines 107a, 107b may be located inside fuselage 101 or on wings 102. In further embodiments, the same engine(s) may provide both lifting and thrust power, such as an engine with turboshaft, turbofan, and/or turboprop capabilities. Each of blades 106a, 106b comprises a blade-lock assembly that is selectively operable to enable or disable a folding degree of freedom and a pitching degree of freedom for the respective blade 106a, 106b.

The pitch-fold locks shown and described herein have advantage over previous designs, including that each version in this disclosure has a dual-output shaft actuator instead of a single output. This provides for sufficient stiffness throughout the system to get proper preload for keeping each side tightly locked, whereas there may not be sufficient stiffness with previous single-sided designs. In addition, capability for overcentering in each locked position provides for passive locking, which is preferred to eliminate additional components required for locking. Another key difference from prior designs is that the system drives the fold-lock hook directly. Benefits of the new designs include easier rigging during installation as well as lower weight and centrifugal force.

Figure 2A:
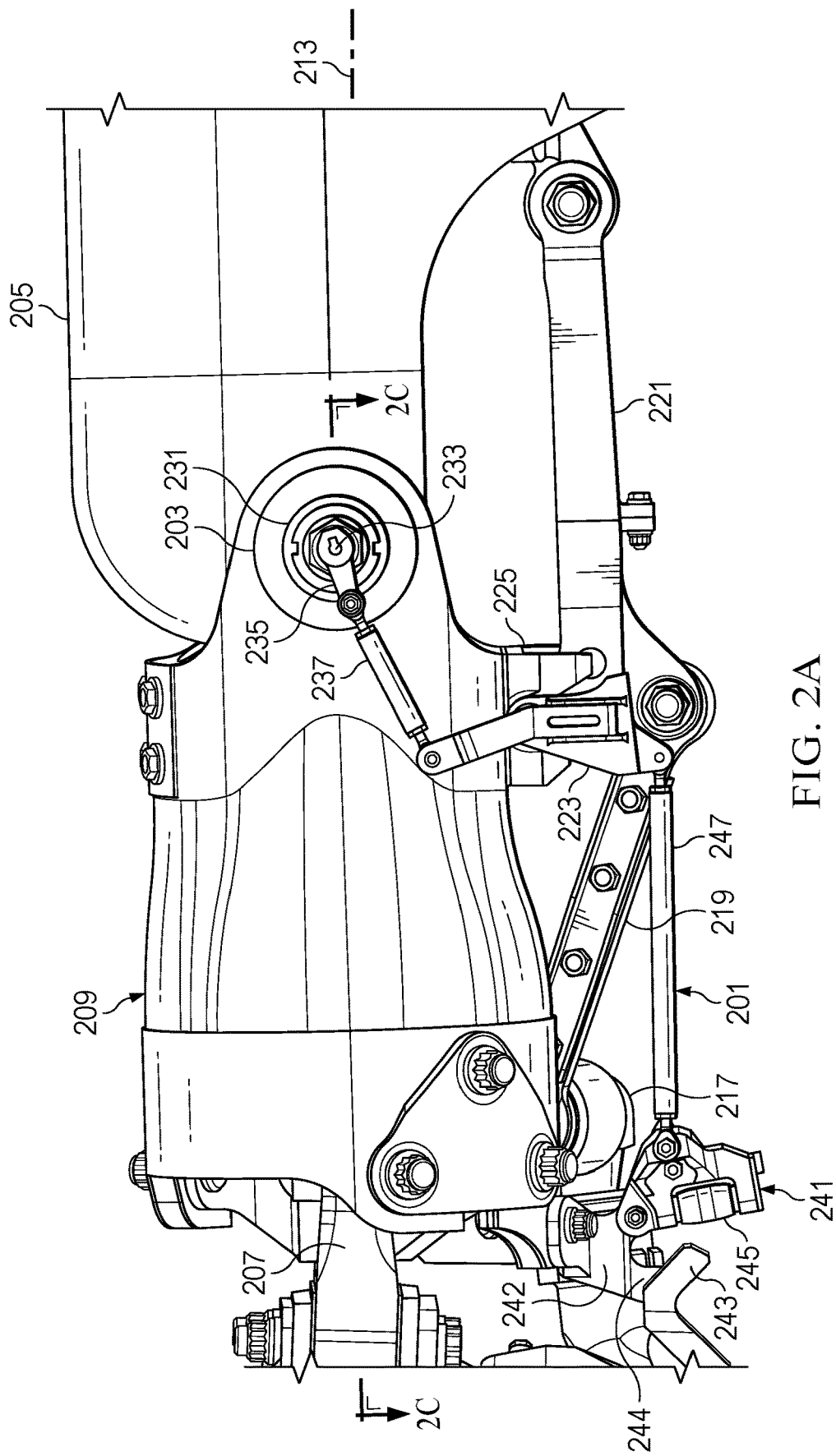
FIGS. 2A-2F illustrate an exemplary pitch-fold lock system utilizing an actuator mounted in a blade bolt to move between fold-locked and pitch-locked configurations.
Figure 2B:
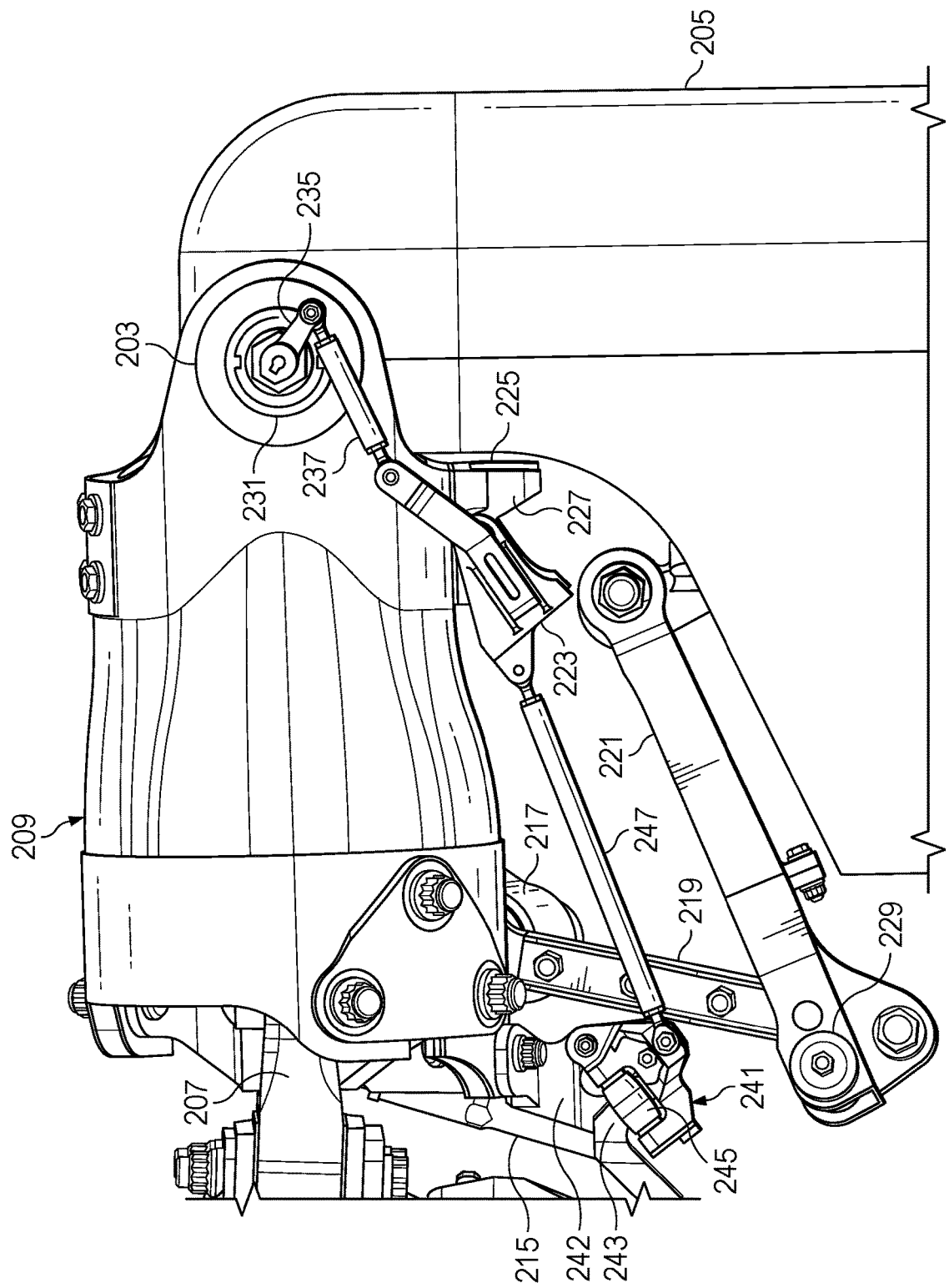
Figure 2C:
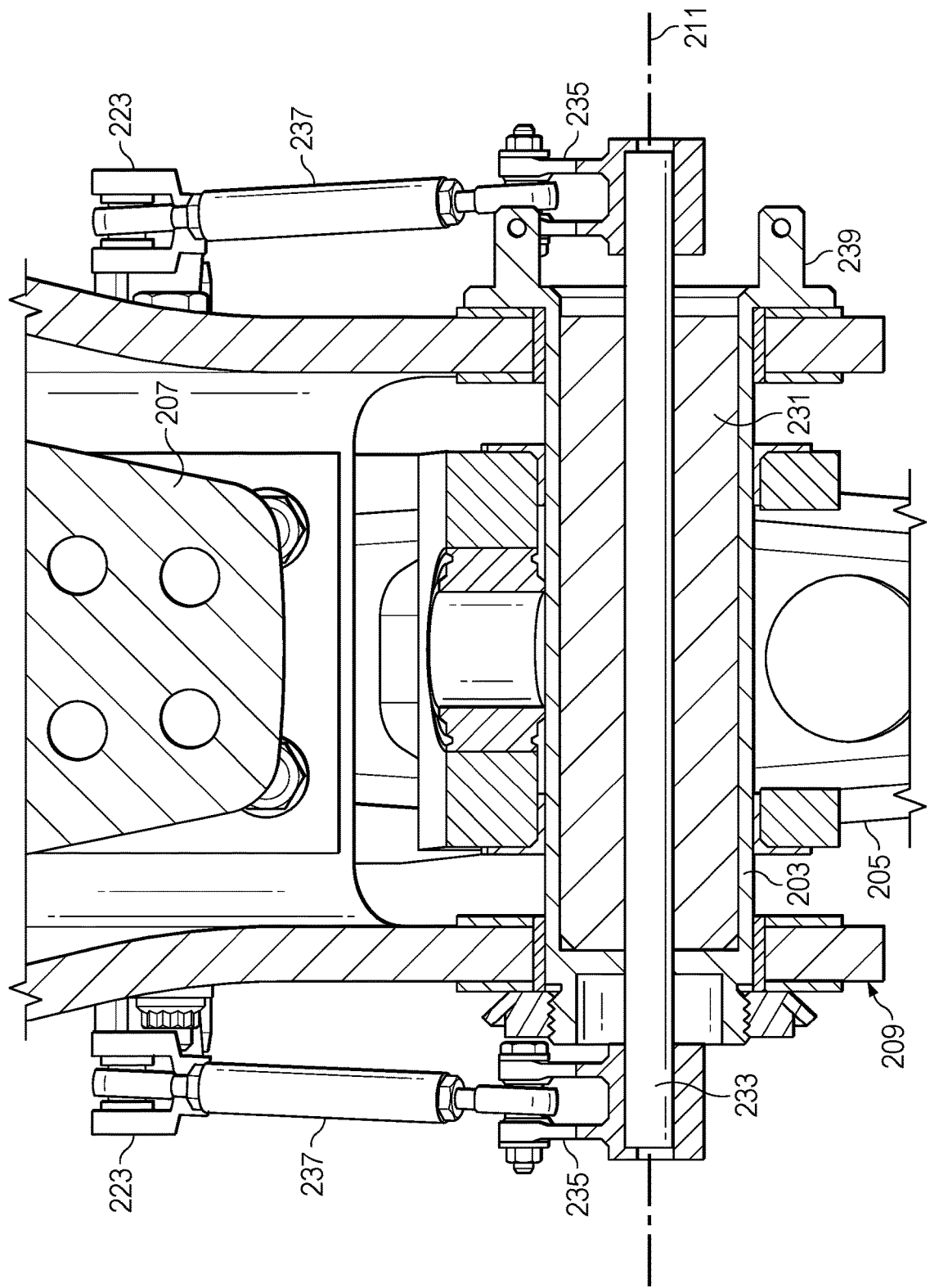
Figure 2D:
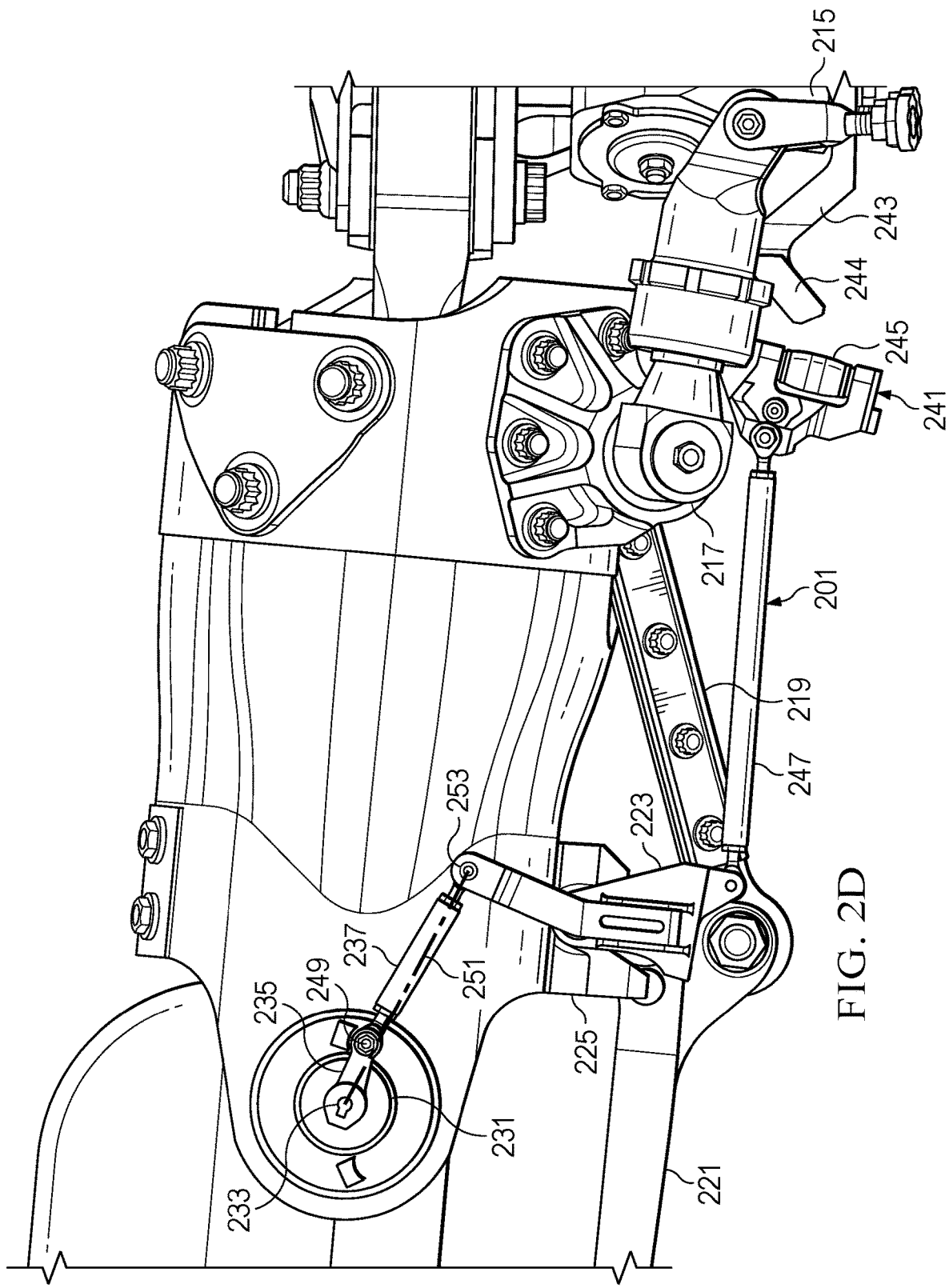
Figure 2E:
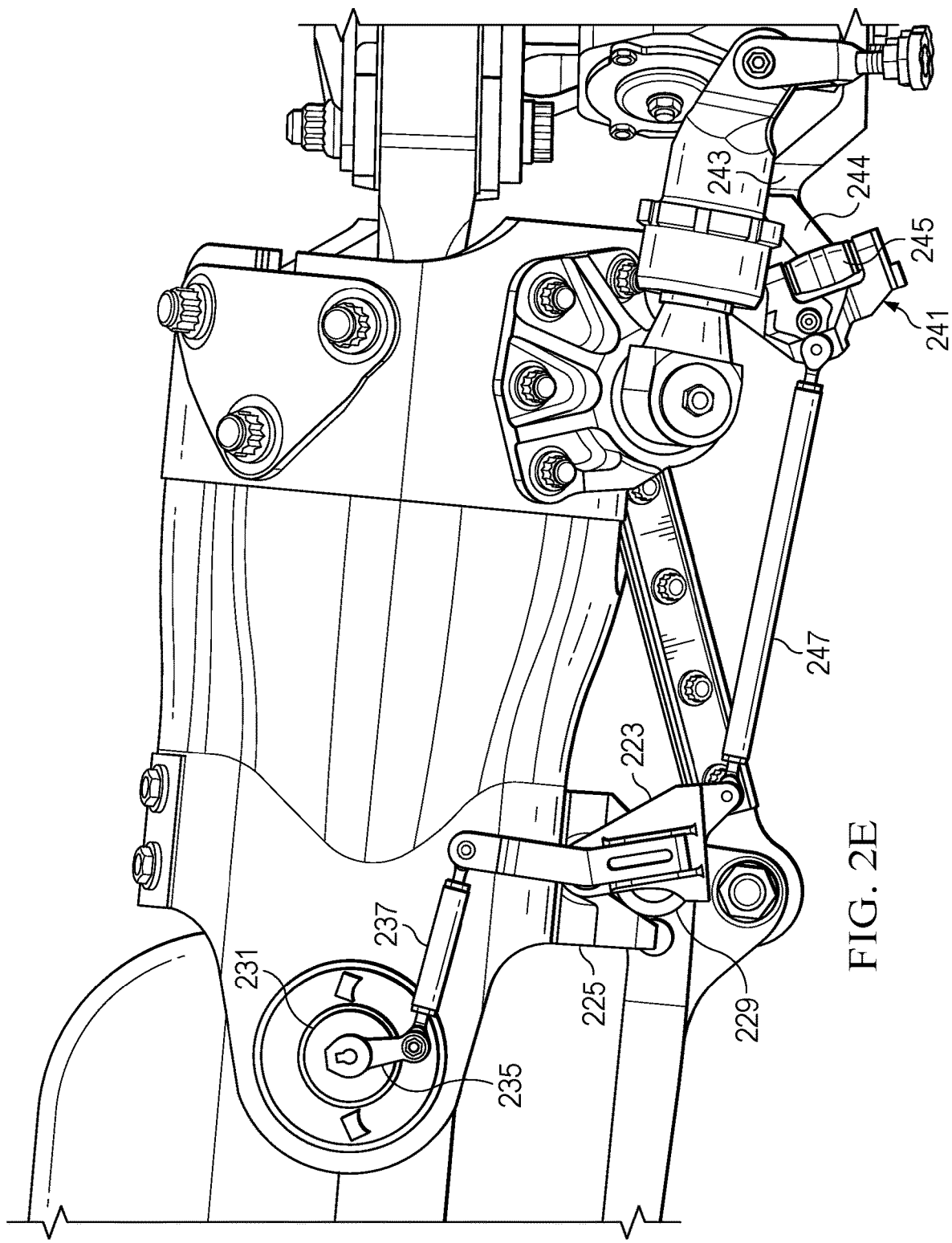
Figure 2F:
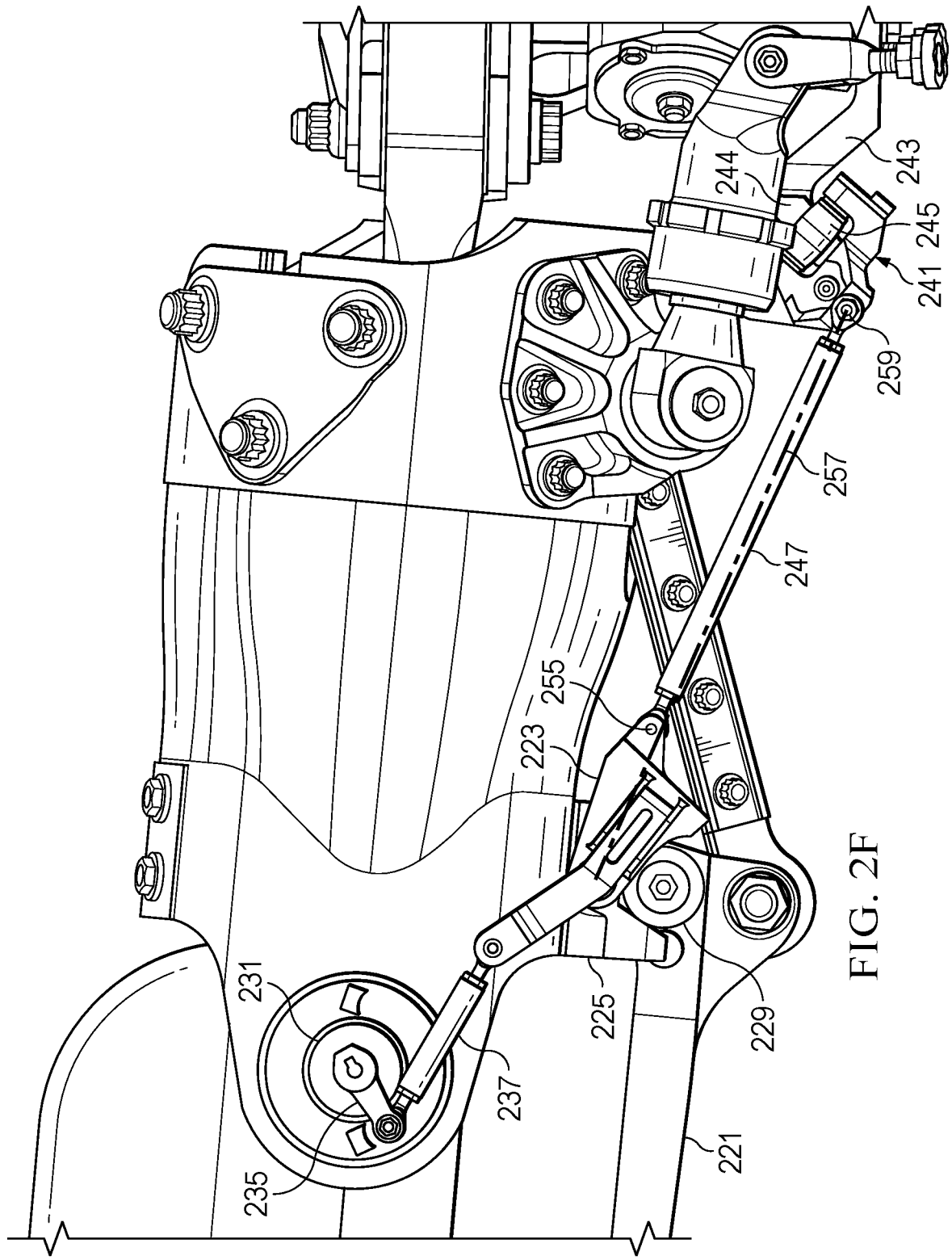

FIGS. 2A-2F illustrate an exemplary pitch-fold lock system 201 utilizing an actuator mounted in a grip bolt 203 and configured to move the components of system 201 between a fold-locked position (shown in FIGS. 2A and 2D) and a pitch-locked position (shown in FIGS. 2B and 2F).

Blade 205 is coupled to a yoke arm 207 of a central rotor hub, which is coupled to a mast (not shown) for rotation therewith about a rotor axis. Blade 205 is coupled with bolt 203 to a blade grip 209, and blade 205 is configured to be selectively pivoted about fold axis 211 (FIG. 2C) relative to grip 209 between an extended position (shown in FIG. 2A) and a folded position (shown in FIG. 2B). Grip 209 and blade 205 are also pivotable together relative to yoke arm 207 about pitch axis 213. A pitch link 215 is coupled to a pivotable pitch horn 217, and intermediate fold link 219 is coupled to pitch horn 219 for rotation therewith. Intermediate link 219 is rotatably coupled to one end of blade-fold link 221, and the other end of link 221 is pivotably coupled to blade 205. Folding motion of blade 205 occurs through pitch link 215 rotating pitch horn 217, causing intermediate link 219 to rotate for folding or extending blade 205 through motion of link 221.

A pair of hook locks 223 are located on opposing sides of an anchor 225 and are pivotable relative to anchor 225. Anchor 225 is fixedly coupled to a trailing edge of grip 209 and has a concave saddle 227 sized for receiving flanges 229 located on each side of link 221. Locks 223 have a fold-lock position (FIG. 2A), in which each lock 223 retains the associated flange 229 within saddle 227 for securing link 221 to anchor 225, and a fold-unlocked position (FIG. 2B), in which locks 223 are rotated to a position that allows flanges 229 to move away from saddle 227 and for link 221 to rotate away from grip 209.

The motion of hook locks 223 are controlled by pitch-fold lock system 201. A rotary actuator 231 is carried within blade bolt 203 and configured to selectively rotate shaft 233, which extends from each end of actuator 231. These components are visible in FIG. 2C as a cross-section view at plane 2C-2C shown on FIG. 2A. An arm 235 is fixedly coupled to each end of shaft 233, allowing for rotation of shaft 233 to rotate arms 235. Each of a pair of hook links 237 is adjustable for length and pivotably couples a free end of each arm 235 to an associated lock 223, so that rotation of shaft 233 causes rotation of locks 223. Snubbers 239 (FIG. 2C) or similar features may be used to set a maximum limit for rotation of arms 235 or may be used to define preload or overcentering amounts. In the fold-lock position, pitch-fold lock system 201 keeps blade 205 in the extended configuration, thereby preventing blade 205 from folding; however, grip 209 is not locked, allowing for the pitch of rotor blade 207 to be adjusted by rotation of grip 209 and blade 205 together about pitch axis 213.

To prevent rotation of grip 209 and blade 205 about pitch axis 213 when blade 205 is folded, a hoop lock 241 is pivotably coupled to a mount 242 on a trailing portion of grip 209, and lock 241 engages both a blade-stop tab 243 and a grip tab 244 extending from mount 242 between rollers 245. When lock 241 is rotated into engagement with tabs 243, 244, as shown in FIGS. 2B and 2F, tabs 243, 244 are pinched between rollers 245, and this prevents rotation of grip 209 relative to yoke arm 207.

The motion of hoop lock 241 is also controlled by pitch-fold lock system 201. Each of a pair of hoop links 247 is adjustable for length and pivotably couples each hook 223 to lock 241, so that rotation of shaft 233 causes rotation of both locks 223 and lock 241.

FIGS. 2D-2F illustrate system 201 in the fold-lock configuration (FIG. 2D), a mid-travel configuration (FIG. 2E), and the pitch-lock configuration (FIG. 2F).

Referring to FIG. 2D, shaft arm 235 has been rotated to position hook lock 223 in the fold-lock position, in which lock 223 retains flange 229 (not visible) adjacent anchor 225, with hoop lock 241 in the pitch-unlocked position. Passive overcenter locking is achieved in the fold-lock position when joint 249 coupling arm 235 to hook link 237 is rotated beyond a line 251 defined by the axis of rotation of shaft 233 and joint 253 coupling link 237 to lock 223. This provides locking in the fold-lock configuration without additional locking components.

Referring to FIG. 2F, shaft arm 235 has been rotated to position hook lock 223 in the fold-unlock position, in which lock 223 allows flange 229 to move away from anchor 225, with hoop lock 241 in the pitch-locked position. Passive overcenter locking is achieved in the pitch-lock position when joint 255 coupling hook lock 223 to hoop link 247 is rotated beyond a line 257 defined by the axis of rotation of lock 223 and joint 259 coupling link 247 to hoop lock 241. This provides locking in the pitch-lock configuration without additional locking components.

Locating rotary actuator 231 in bolt 203 has advantages, including providing a protected space for actuator 231, but increasing the size of bolt 203 to accommodate actuator 231 means that blade 203 and grip lugs around bolt 203 have to be larger and may interfere with folding or require repackaging. However, the mechanism of system 201 has a lower part count than previous designs and may be lighter with lower centrifugal force. In addition, packaging of the components during design and rigging of the system during assembly and maintenance may be simpler. Phasing of fold locking and pitch locking may be determined with, for example, changes to sizes of components (including lengths of links 237, 247) or changes to positions of components. FIG. 2E shows system 201 rotated between the fold-lock and pitch-lock configurations, and consideration should be given to avoid indeterminate phasing in the transition between the locking positions. Preload may be applied in either lock position to further assist in preventing uncommanded motions away from a lock position. It should be noted that a spring link, as disclosed in the incorporated references, may be used in place of either or both adjustable solid links 237, 247.

Figure 3A:
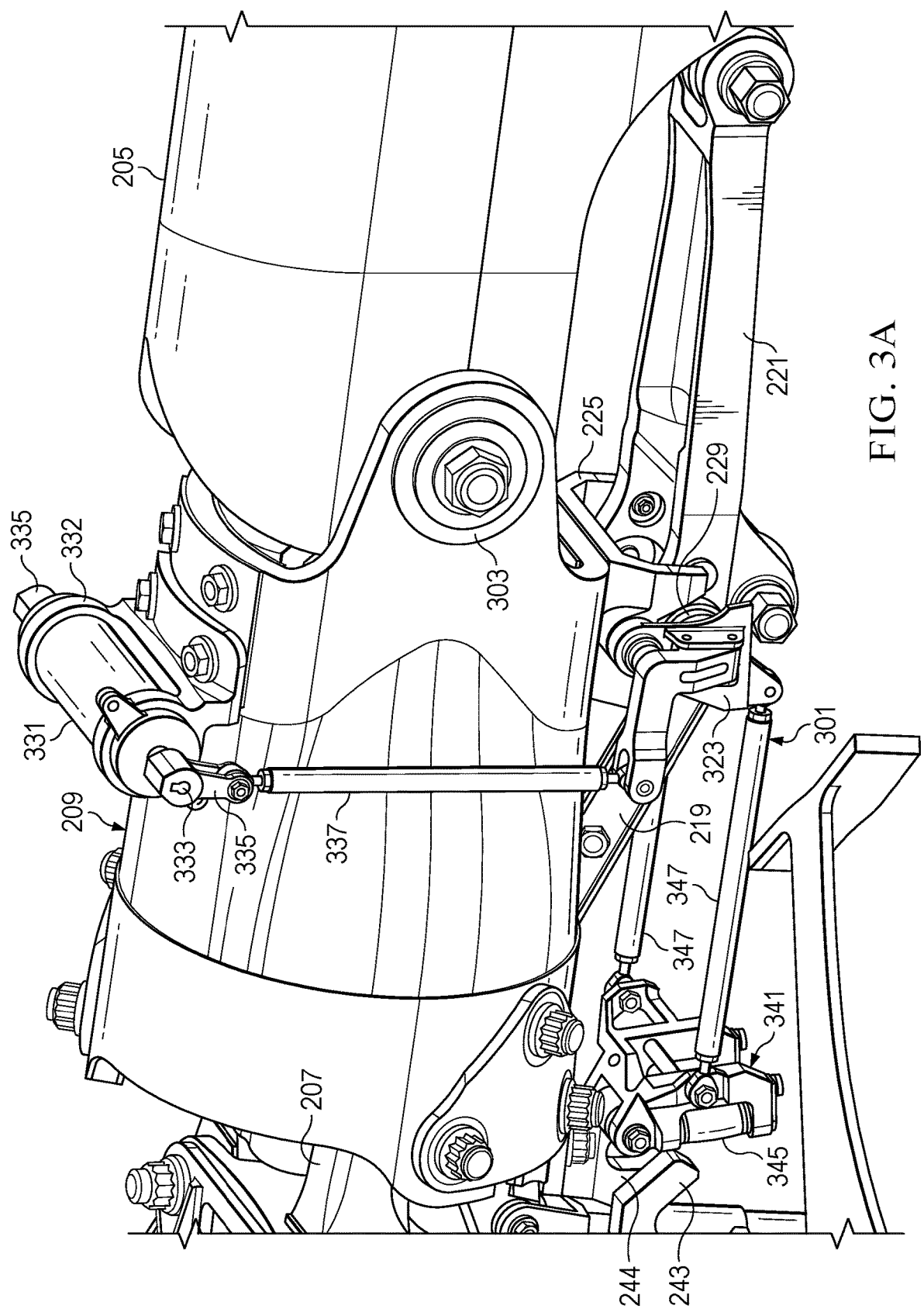
FIGS. 3A-3E illustrate an exemplary pitch-fold lock system utilizing an actuator mounted on a leading edge of a blade grip to move between fold-locked and pitch-locked configurations.
Figure 3B:
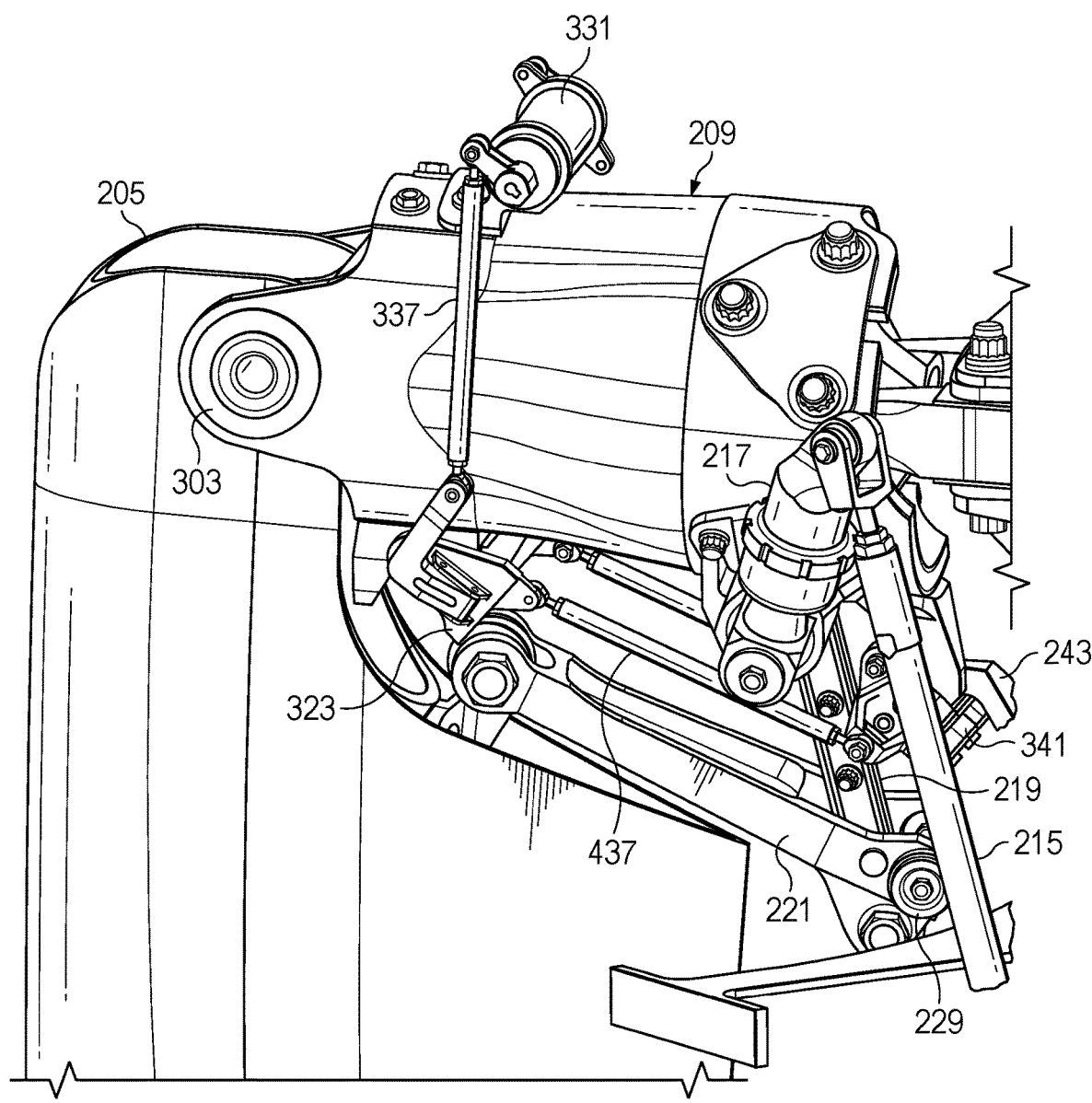
Figure 3C:
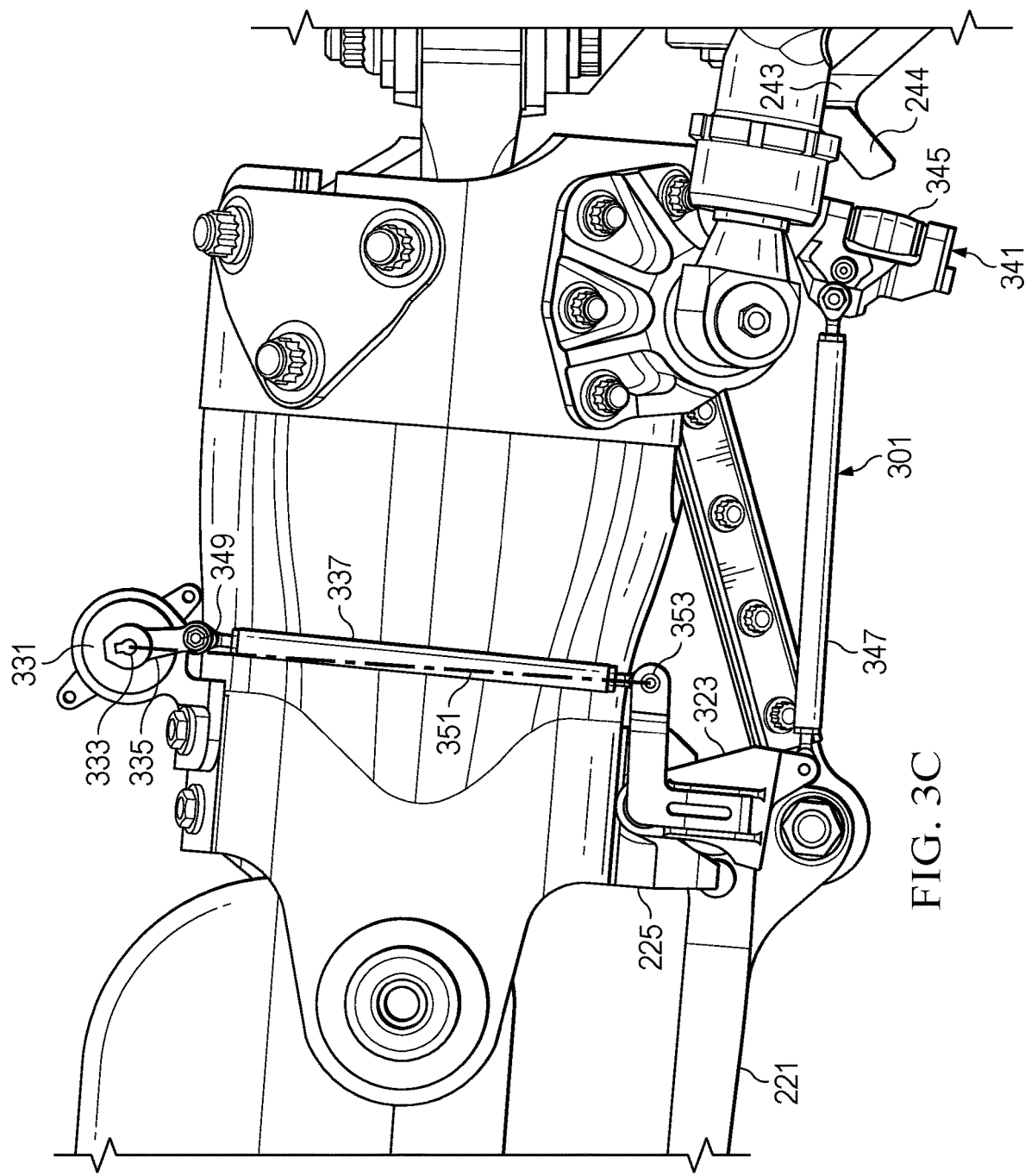
Figure 3D:
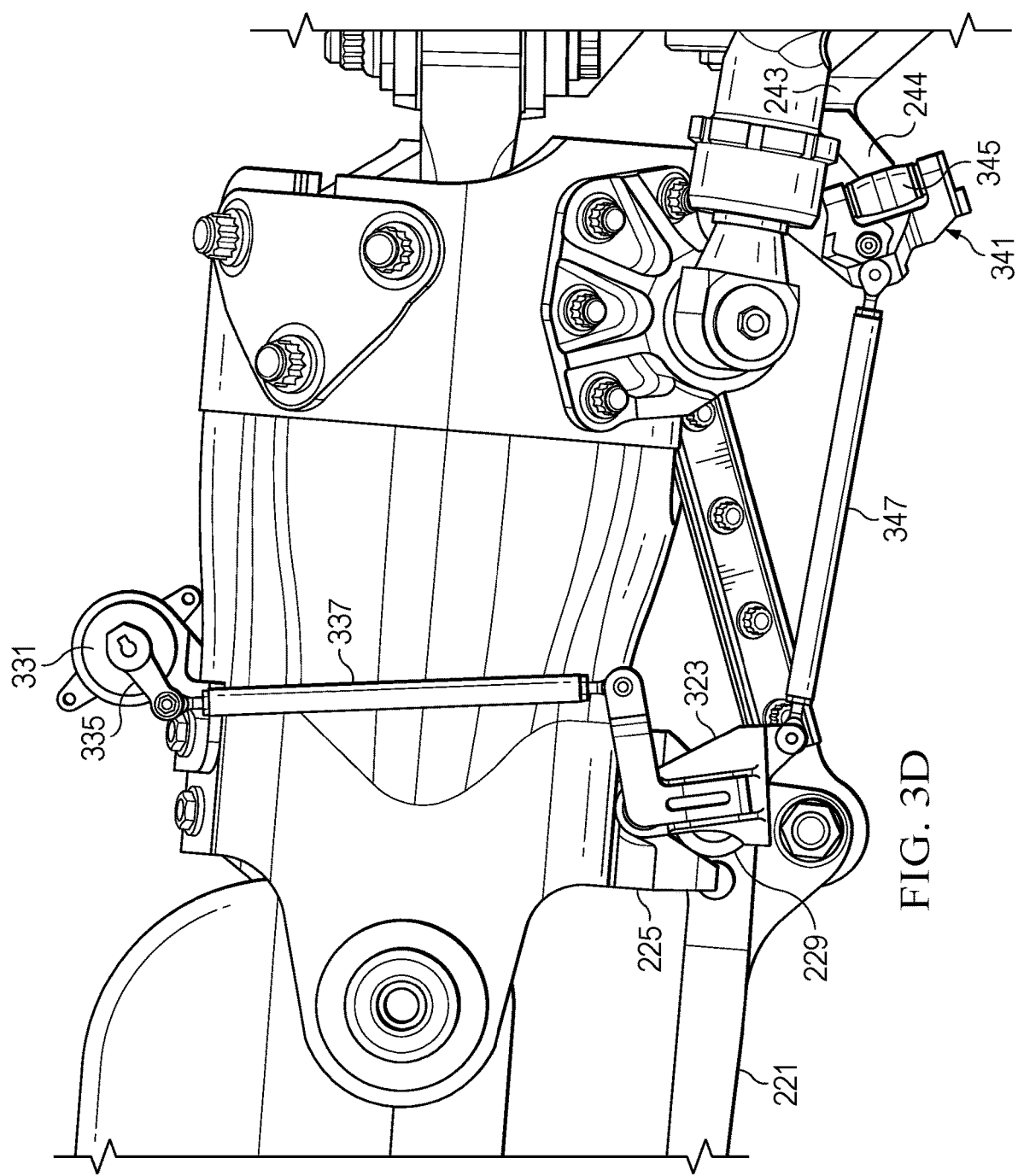
Figure 3E:
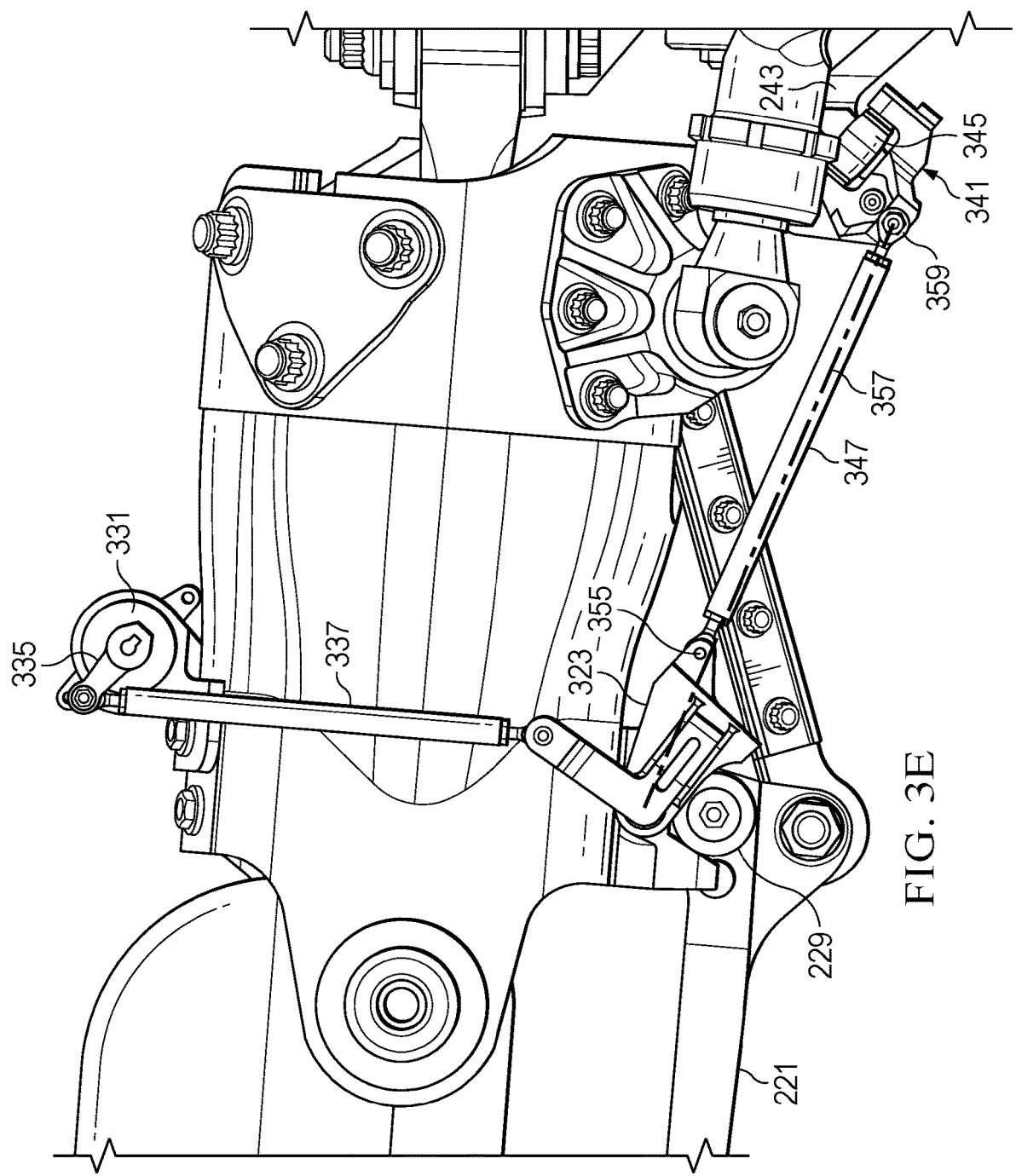

FIGS. 3A-3E illustrate an exemplary pitch-fold lock system 301 utilizing an actuator mounted on a leading edge of blade grip 303 and configured to move the components of system 301 between a fold-locked position (shown in FIGS. 3A and 3C) and a pitch-locked position (shown in FIGS. 3B and 3E). System 301 comprises components similar to system 201, and similar components have similar numbers. System 301 can be used in place of system 201.

Blade 205 is coupled to a yoke arm 207 of a central rotor hub, which is coupled to a mast (not shown) for rotation therewith about a rotor axis. Blade 205 is coupled with bolt 303 to blade grip 209, and blade 205 is configured to be selectively pivoted about a fold axis relative to grip 209 between an extended position (shown in FIG. 3A) and a folded position (shown in FIG. 3B). Grip 209 and blade 205 are also pivotable together relative to yoke arm 207 about a pitch axis. A pitch link 215 is coupled to a pivotable pitch horn 217, and intermediate fold link 219 is coupled to pitch horn 219 for rotation therewith. Intermediate link 219 is rotatably coupled to one end of blade-fold link 221, and the other end of link 221 is pivotably coupled to blade 205.

A pair of hook locks 323 are located on opposing sides of anchor 225 and are pivotable relative to anchor 225. Locks 323 have a fold-lock position (FIG. 3A), in which each lock 323 retains the associated flange 229 for securing link 221 to anchor 225, and a fold-unlocked position (FIG. 3B), in which locks 323 are rotated to a position that allows flanges 229 to move away from anchor 225 and for link 221 to rotate away from grip 209.

The motion of hook locks 323 are controlled by pitch-fold lock system 301. Rotary actuator 331 is carried within a mount 332 coupled to a leading edge of grip 209 and configured to selectively rotate shaft 333, which extends from each end of actuator 331. An arm 335 is fixedly coupled to each end of shaft 333, allowing for rotation of shaft 333 to rotate arms 335. Each of a pair of hook links 337 is adjustable for length and pivotably couples a free end of each arm 335 to an associated lock 323, so that rotation of shaft 333 causes rotation of locks 323. In the fold-lock position, pitch-fold lock system 301 keeps blade 205 in the extended configuration, thereby preventing blade 205 from folding; however, grip 209 is not locked, allowing for the pitch of rotor blade 207 to be adjusted by rotation of grip 209 and blade 205 together about the pitch axis.

To prevent rotation of grip 209 and blade 205 about pitch axis 213 when blade 205 is folded, a hoop lock 341 is pivotably coupled to a mount 242 on a trailing portion of grip 209, and lock 341 engages both a blade-stop tab 243 and a grip tab 244 extending from mount 242 between rollers 245. When lock 341 is rotated into engagement with tabs 243, 244, as shown in FIGS. 3B and 3E, tabs 243, 244 are pinched between rollers 245, and this prevents rotation of grip 209 relative to yoke arm 207.

The motion of hoop lock 341 is also controlled by pitch-fold lock system 301. Each of a pair of hoop links 347 is adjustable for length and pivotably couples each hook 323 to lock 341, so that rotation of shaft 333 causes rotation of both locks 323 and lock 341.

FIGS. 3C-3E illustrate system 301 in the fold-lock configuration (FIG. 3C), a mid-travel configuration (FIG. 3D), and the pitch-lock configuration (FIG. 3E).

Referring to FIG. 3C, shaft arm 335 has been rotated to position hook lock 323 in the fold-lock position, in which lock 323 retains flange 229 (not visible) adjacent anchor 225, with hoop lock 341 in the pitch-unlocked position. Passive overcenter locking is achieved in the fold-lock position when joint 349 coupling arm 335 to hook link 337 is rotated beyond a line 351 defined by the axis of rotation of shaft 333 and joint 353 coupling link 337 to lock 323. This provides locking in the fold-lock configuration without additional locking components.

Referring to FIG. 3E, shaft arm 335 has been rotated to position hook lock 323 in the fold-unlock position, in which lock 323 allows flange 229 to move away from anchor 225, with hoop lock 341 in the pitch-locked position. Passive overcenter locking is achieved in the pitch-lock position when joint 355 coupling hook lock 323 to hoop link 347 is rotated beyond a line 357 defined by the axis of rotation of lock 323 and joint 359 coupling link 347 to hoop lock 341. This provides locking in the pitch-lock configuration without additional locking components.

At least some of the alternatives and advantages described for system 201 apply to system 301, and locating rotary actuator 331 inboard of blade bolt 303 has the advantage of lower centrifugal force. As described above, phasing of fold locking and pitch locking may be determined with component characteristics, and consideration should be given to avoid indeterminate phasing in the transition between the locking positions. FIG. 3D shows system 301 rotated between the fold-lock and pitch-lock configurations.

Figure 4A:
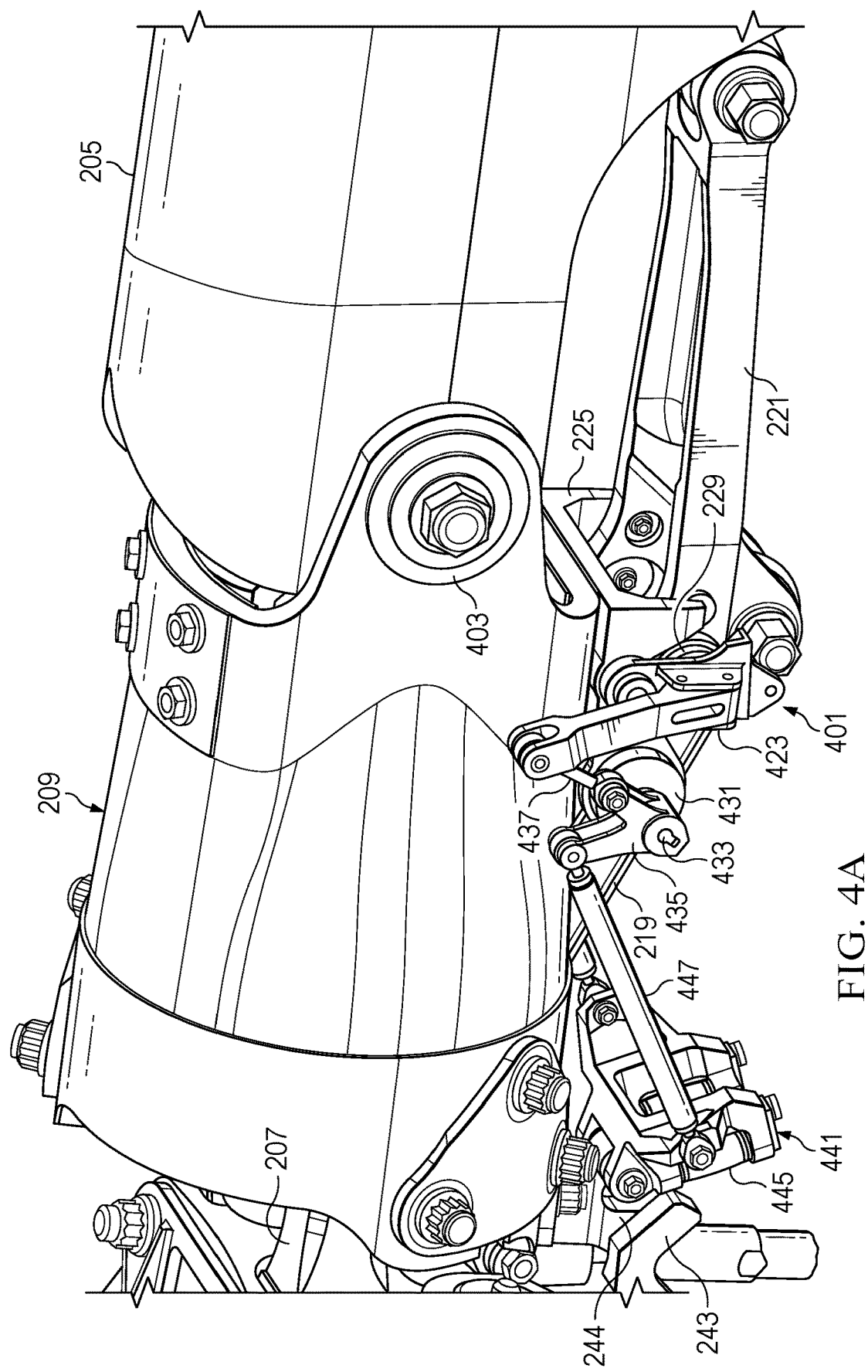
FIGS. 4A-4E illustrate an exemplary pitch-fold lock system utilizing an actuator mounted on a trailing edge of a blade grip to move between fold-locked and pitch-locked configurations.
Figure 4B:
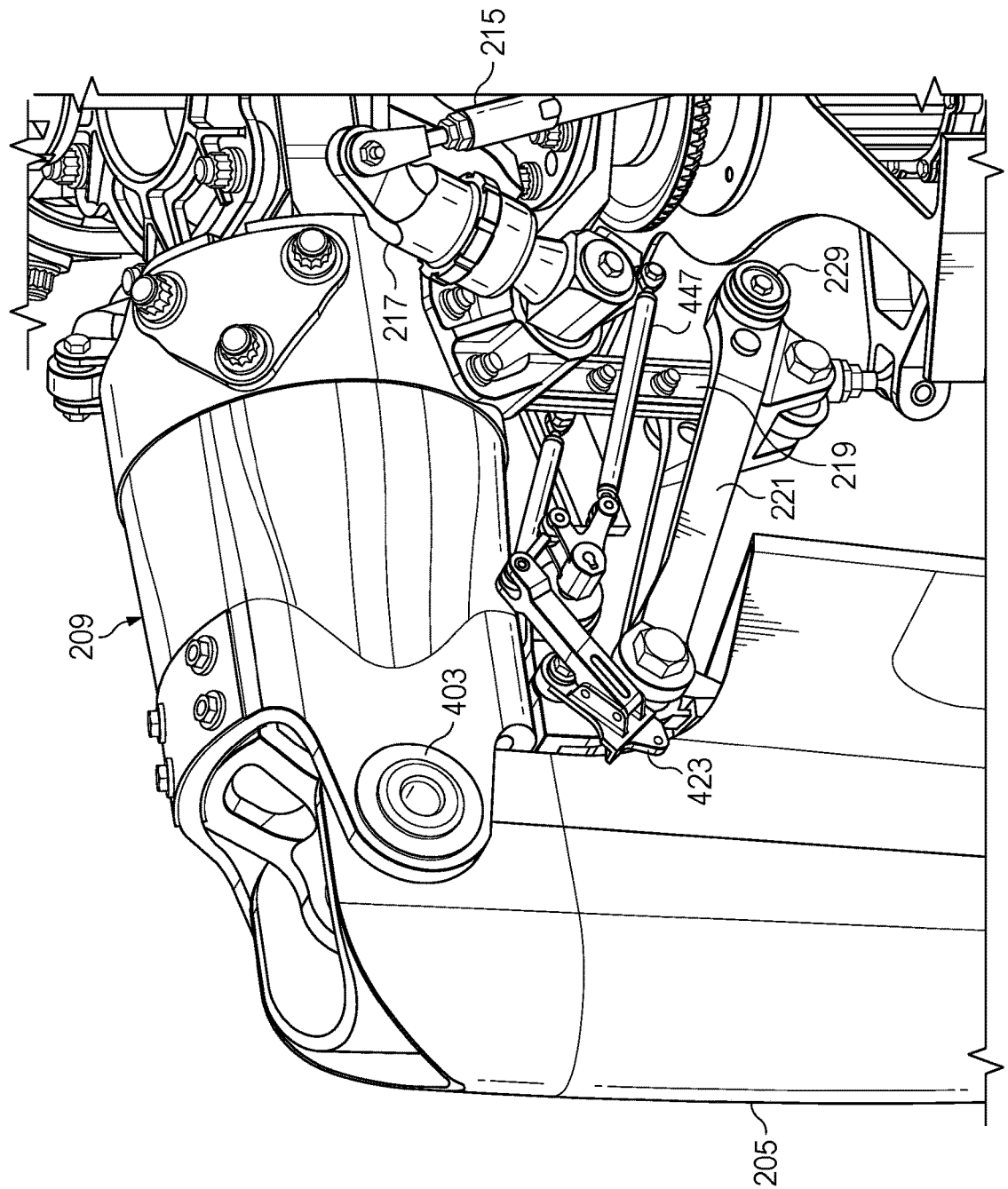
Figure 4C:
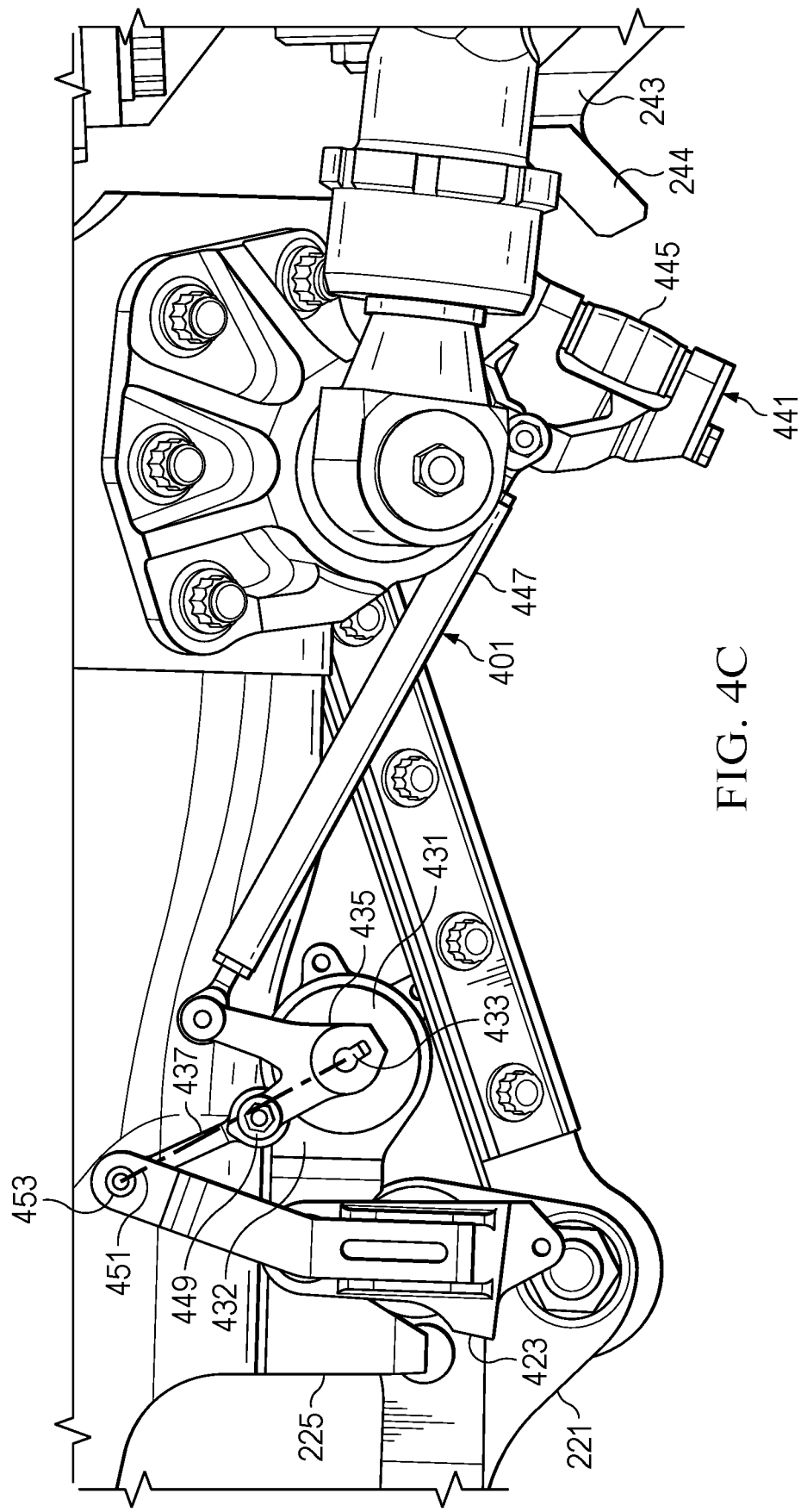
Figure 4D:
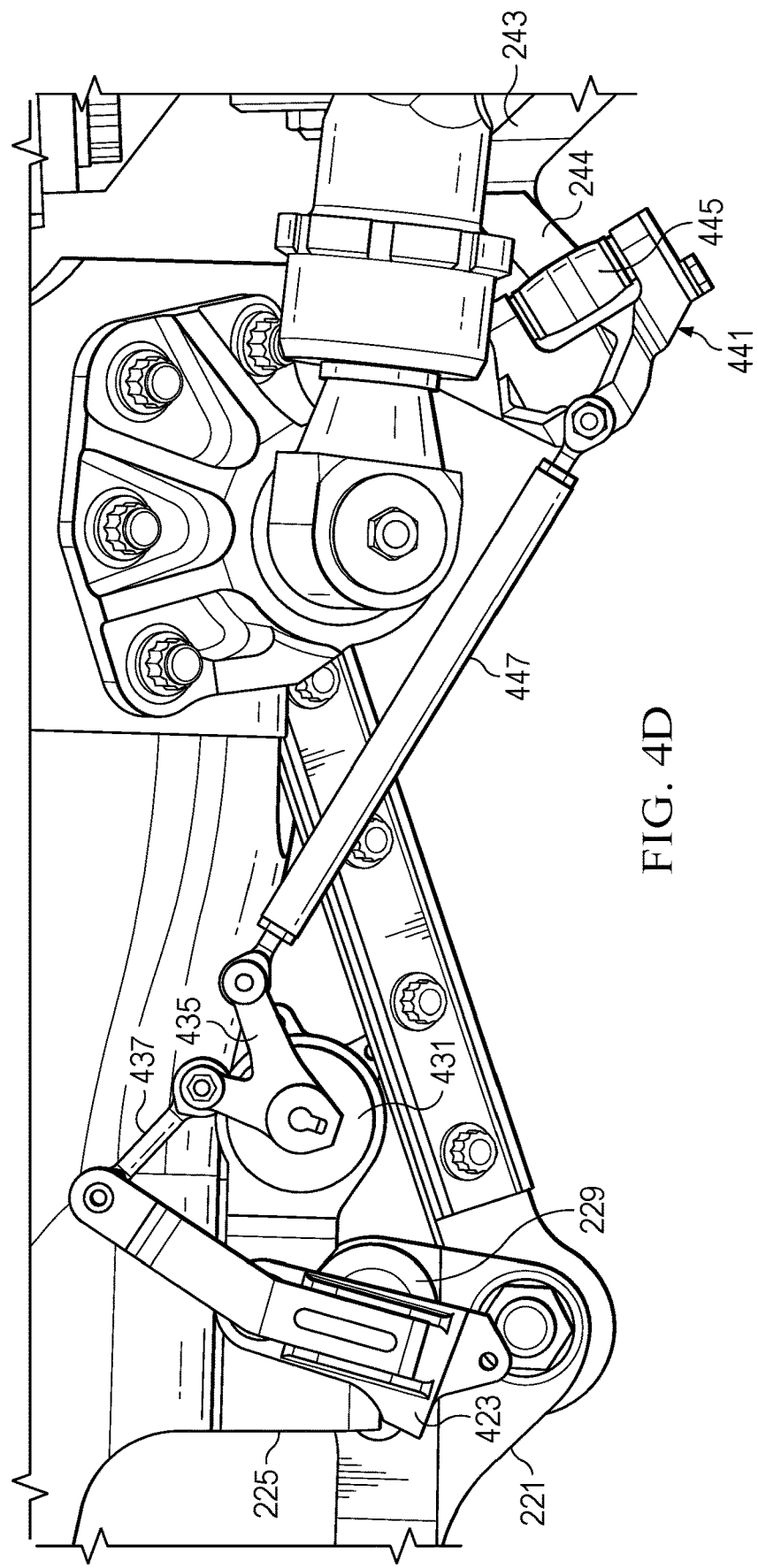
Figure 4E:
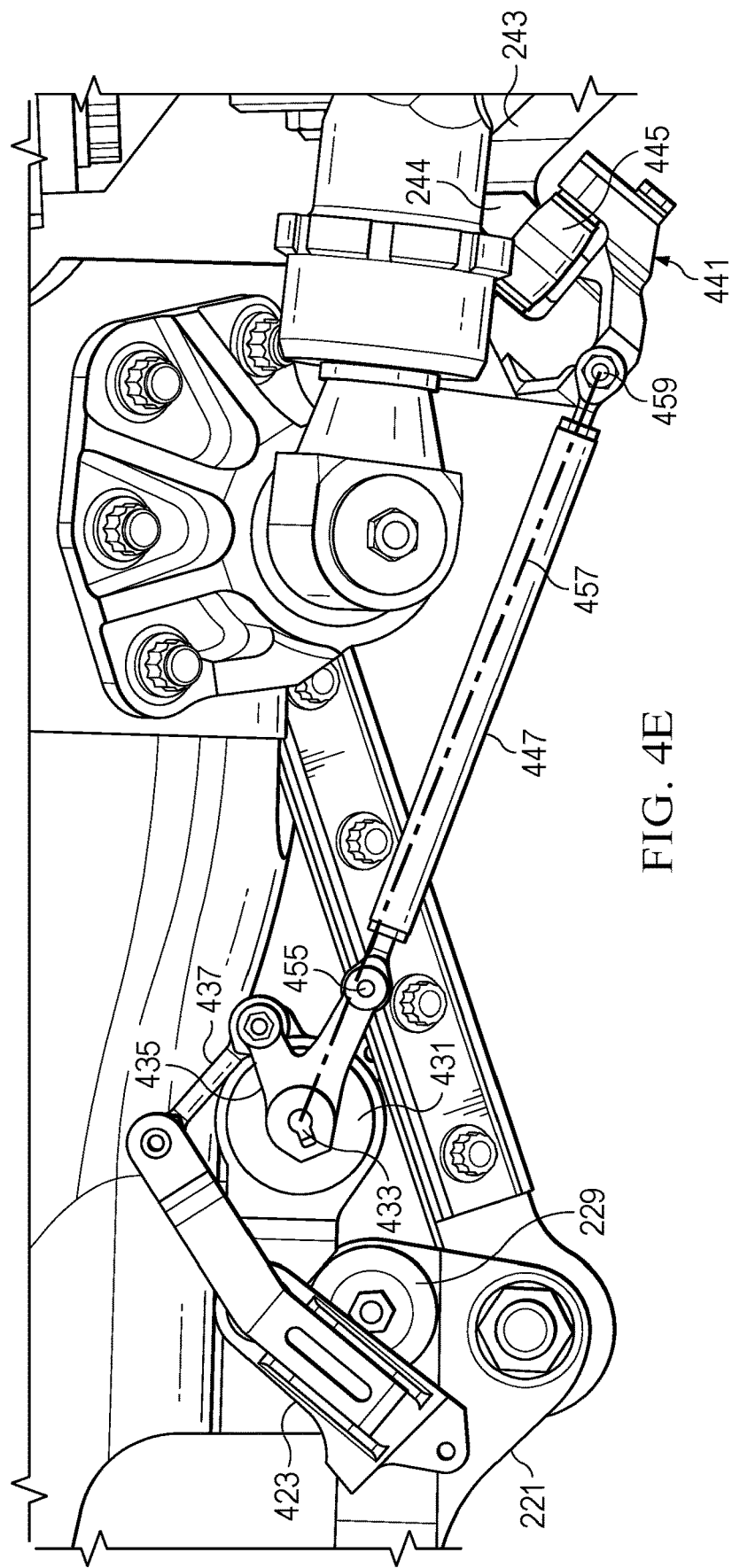

FIGS. 4A-4E illustrate an exemplary pitch-fold lock system 401 utilizing an actuator mounted on a trailing edge of blade grip 209 and configured to move the components of system 401 between a fold-locked position (shown in FIGS. 4A and 4C) and a pitch-locked position (shown in FIGS. 4B and 4E). System 401 comprises components similar to systems 201, 301, and similar components have similar numbers. System 401 can be used in place of either system 201 or 301.

Blade 205 is coupled to a yoke arm 207 of a central rotor hub, which is coupled to a mast (not shown) for rotation therewith about a rotor axis. Blade 205 is coupled with bolt 403 to blade grip 209, and blade 205 is configured to be selectively pivoted about a fold axis relative to grip 209 between an extended position (shown in FIG. 4A) and a folded position (shown in FIG. 4B). Grip 209 and blade 205 are also pivotable together relative to yoke arm 207 about a pitch axis. A pitch link 215 is coupled to a pivotable pitch horn 217, and intermediate fold link 219 is coupled to pitch horn 219 for rotation therewith. Intermediate link 219 is rotatably coupled to one end of blade-fold link 221, and the other end of link 221 is pivotably coupled to blade 205.

A pair of hook locks 423 are located on opposing sides of anchor 225 and are pivotable relative to anchor 225. Locks 423 have a fold-lock position (FIG. 4A), in which each lock 423 retains the associated flange 229 for securing link 221 to anchor 225, and a fold-unlocked position (FIG. 3B), in which locks 423 are rotated to a position that allows flanges 229 to move away from anchor 225 and for link 221 to rotate away from grip 209.

The motion of hook locks 423 are controlled by pitch-fold lock system 401. Rotary actuator 431 is carried within a mount 432 coupled to a trailing edge of grip 209 and configured to selectively rotate shaft 433, which extends from each end of actuator 431. A V-shaped arm 435 is fixedly coupled to each end of shaft 433, allowing for rotation of shaft 433 to rotate arms 435. Each of a pair of hook links 437 is adjustable for length and pivotably couples one of a pair of free ends of each arm 435 to an associated lock 423, so that rotation of shaft 433 causes rotation of locks 423. In the fold-lock position, pitch-fold lock system 401 keeps blade 205 in the extended configuration, thereby preventing blade 205 from folding; however, grip 209 is not locked, allowing for the pitch of rotor blade 207 to be adjusted by rotation of grip 209 and blade 205 together about the pitch axis. It should be noted that the configuration of system 401 causes hooks 423 to rotate in the opposite directions from hooks 223 of system 201 and hooks 323 of system 301.

To prevent rotation of grip 209 and blade 205 about pitch axis 213 when blade 205 is folded, a hoop lock 441 is pivotably coupled to a mount 242 on a trailing portion of grip 209, and lock 441 engages both a blade-stop tab 243 and a grip tab 244 extending from mount 242 between rollers 245. When lock 441 is rotated into engagement with tabs 243, 244, as shown in FIGS. 4B and 4E, tabs 243, 244 are pinched between rollers 245, and this prevents rotation of grip 209 relative to yoke arm 207.

The motion of hoop lock 441 is also controlled by pitch-fold lock system 401. Each of a pair of hoop links 447 is adjustable for length and pivotably couples the other of the pair of free ends of each arm 435 to lock 441, so that rotation of shaft 433 causes rotation of both locks 423 and lock 441.

FIGS. 4C-4E illustrate system 401 in the fold-lock configuration (FIG. 4C), a mid-travel configuration (FIG. 4D), and the pitch-lock configuration (FIG. 4E).

Referring to FIG. 4C, shaft arm 435 has been rotated to position hook lock 423 in the fold-lock position, in which lock 423 retains flange 229 (not visible) adjacent anchor 225, with hoop lock 441 in the pitch-unlocked position. Passive overcenter locking is achieved in the fold-lock position when joint 449 coupling arm 435 to hook link 437 is rotated beyond a line 451 defined by the axis of rotation of shaft 433 and joint 453 coupling link 437 to lock 423. This provides locking in the fold-lock configuration without additional locking components.

Referring to FIG. 4E, shaft arm 435 has been rotated to position hook lock 423 in the fold-unlock position, in which lock 423 allows flange 229 to move away from anchor 225, with hoop lock 441 in the pitch-locked position. Passive overcenter locking is achieved in the pitch-lock position when joint 455 coupling arm 435 to hoop link 447 is rotated beyond a line 457 defined by the axis of rotation of shaft 433 and joint 459 coupling link 447 to hoop lock 441. This provides locking in the pitch-lock configuration without additional locking components.

At least some of the alternatives and advantages described for systems 201, 301 apply to system 401, and locating rotary actuator 431 on the trailing edge of grip 209 has the advantage of providing greater impact protection. As described above, phasing of fold locking and pitch locking may be determined with component characteristics, and consideration should be given to avoid indeterminate phasing in the transition between the locking positions. FIG. 4D shows system 401 rotated between the fold-lock and pitch-lock configurations.

The short length of hook links 437 may present a problem allowing for adjustment of the length of each link 437 using threaded ends and jam nuts. However, motion of the locking end of hooks 423 outboard instead of inboard can be a benefit for providing clearance of intermediate link 219 and blade-fold link 221, whereas hooks 223 of system 201 and hooks 323 of system 301 are required to move far inboard to provide such clearance.

Figure 5A:
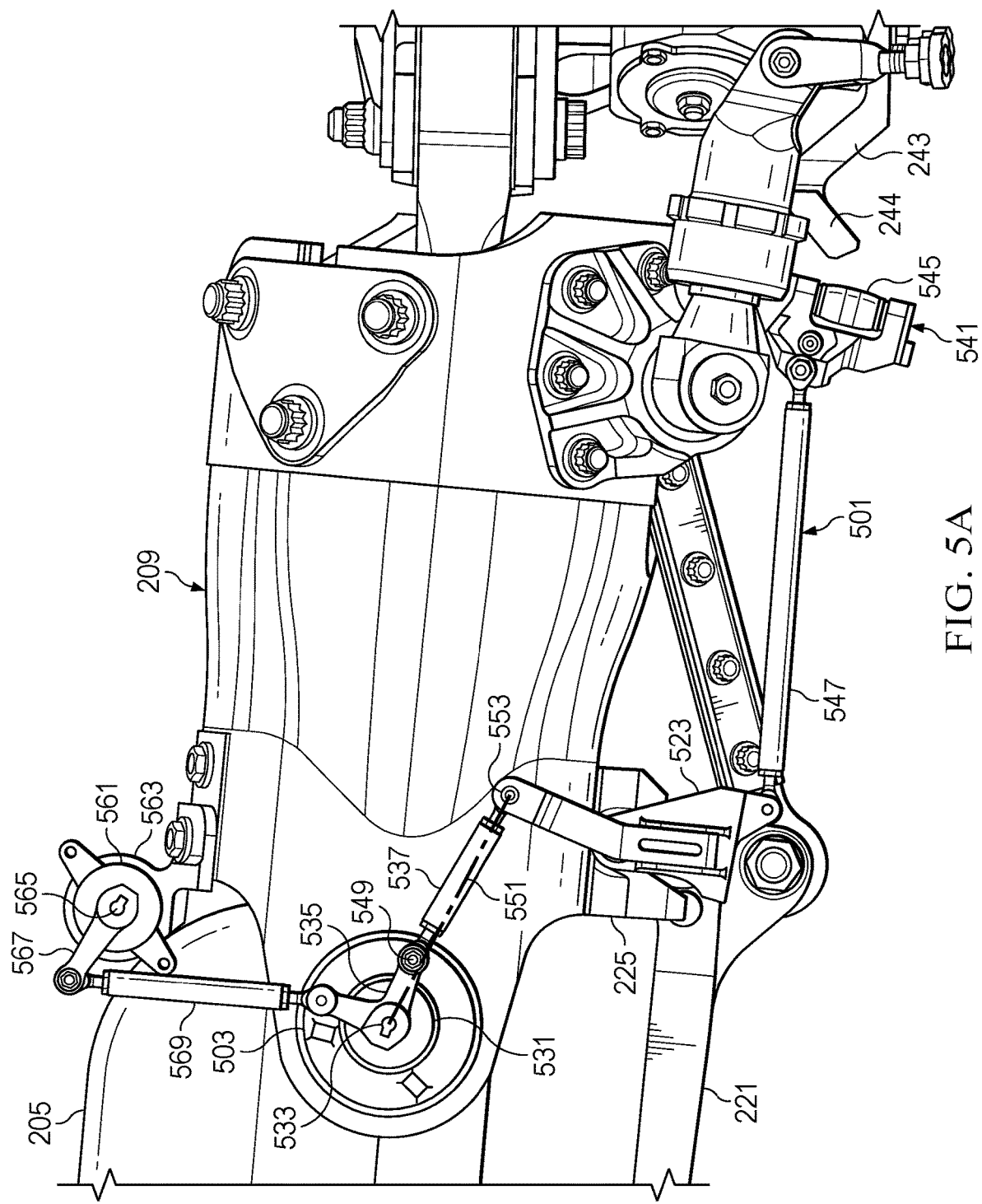
FIGS. 5A-5B illustrate an exemplary pitch-fold lock system 501 including dual actuators, each actuator capable of moving the system between fold-locked and pitch-locked configurations.
Figure 5B:
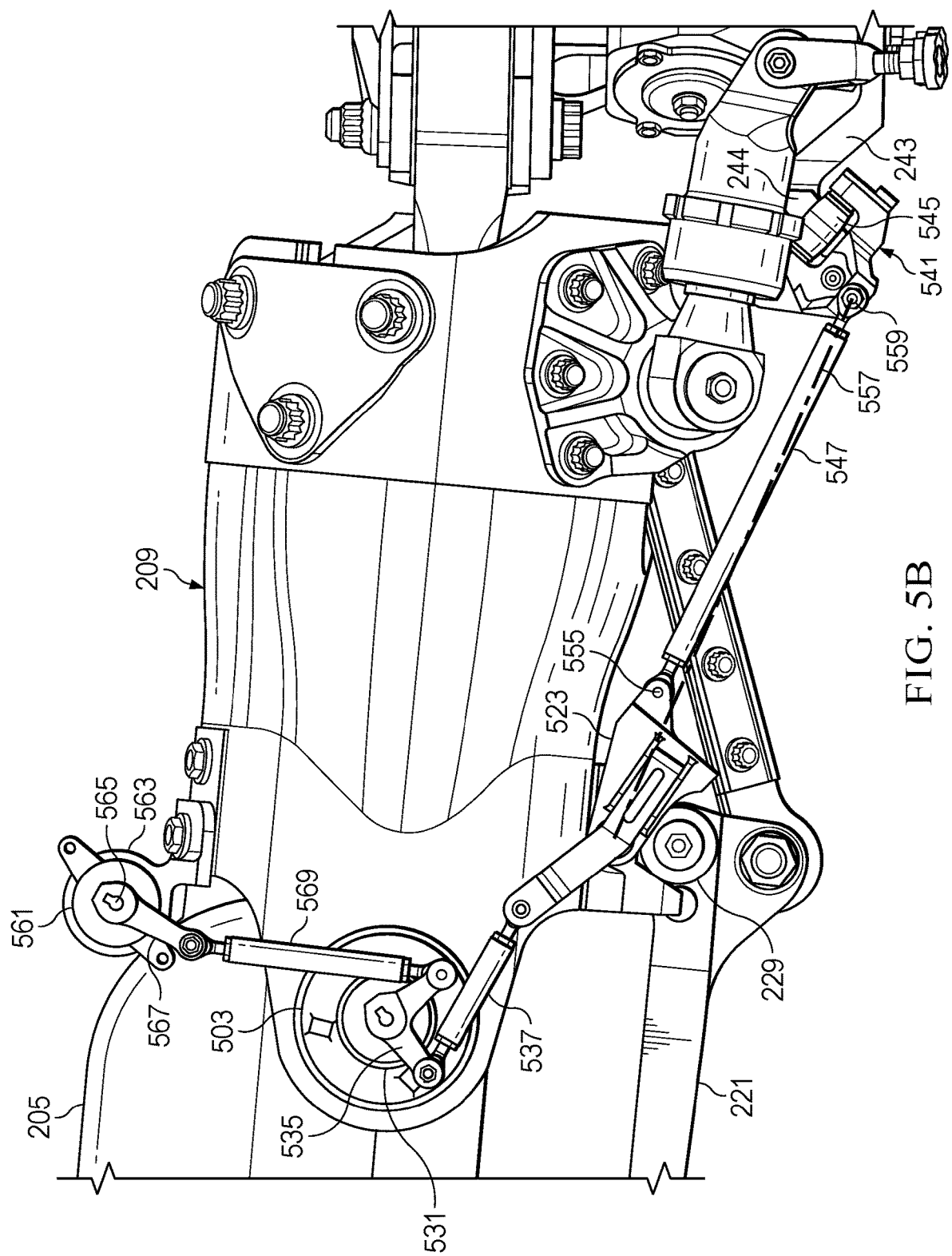

FIGS. 5A-5B illustrate an exemplary pitch-fold lock system 501 including dual actuators, each actuator capable of moving system 501 between a fold-locked position and a pitch-locked position. System 501 is configured like system 201 with the addition of a secondary actuator mounted on grip 209.

Hook locks 523 have a fold-lock position (FIG. 5A), in which each lock 523 retains the associated flange 229 within anchor 225 for securing link 221 to anchor 225, and a fold-unlocked position (FIG. 5B), in which locks 523 are rotated to a position that allows flanges 229 to move away from anchor 225 and for link 221 to rotate away from grip 209.

The motion of hook locks 523 are controlled by pitch-fold lock system 501. A rotary actuator 531 is carried within blade bolt 503 and configured to selectively rotate shaft 533. A V-shaped arm 535 is fixedly coupled to each end of shaft 533, allowing for rotation of shaft 533 to rotate arms 535. Each of a pair of hook links 537 pivotably couples one of a pair of free ends of each arm 535 to an associated lock 523, so that rotation of shaft 533 causes rotation of locks 523.

Hoop lock 541 engages blade-stop tab 243 and grip tab 244 between rollers 545, and motion of lock 541 is also controlled by pitch-fold lock system 501. Each of a pair of hoop links 547 pivotably couples each hook 523 to lock 541, so that rotation of shaft 533 causes rotation of both locks 523 and lock 541.

FIG. 5A illustrates system 501 in the fold-lock configuration, and FIG. 5B illustrates system 501 in the pitch-lock configuration (FIG. 2F). Passive overcenter locking is achieved in the fold-lock position when joint 549 coupling arm 535 to hook link 537 is rotated beyond a line 551 defined by the axis of rotation of shaft 533 and joint 553 coupling link 537 to lock 523. Passive overcenter locking is achieved in the pitch-lock position when joint 555 coupling hook lock 523 to hoop link 547 is rotated beyond a line 557 defined by the axis of rotation of lock 523 and joint 559 coupling link 547 to hoop lock 541. Overcentering provides locking in the fold-lock and pitch-lock configurations without additional locking components.

System 501 comprises a secondary actuator 561 carried within a mount 563 coupled to a leading edge of grip 209 and configured to selectively rotate shaft 565, which extends from each end of actuator 561. An arm 567 is fixedly coupled to each end of shaft 565, allowing for rotation of shaft 565 to rotate arms 567. Each of a pair of secondary drive links 569 is adjustable for length and pivotably couples each arm 567 to the other of the free ends of the associated arms 535, so that rotation of shaft 565 causes rotation of arms 535. This configuration allows for redundant capabilities for operating system 501. Though secondary actuator 561 is shown mounted on the leading edge of grip 209, it should be noted that actuator 561 may alternatively be mounted on a trailing portion of grip 209 like actuator 431 of system 401. In another embodiment, actuators may be mounted on leading and trailing portions of grip 209 instead of one being a bolt-mounted actuator.

FIGS. 6A-7D illustrate exemplary pitch-lock systems utilizing a mast-mounted ring to move between pitch-locked and pitch-unlocked configurations. By removing the pitch-lock hoops from the mechanism that actuates the fold-lock hooks, which are combined in systems 201, 301, 401, 501 described above, these pitch-lock systems provide pitch or fold locking performed in sequence. This eliminates the chance for indeterminate phasing, in which both pitch and fold locks are unlocked at the same time, by 1) locking the hook and confirming it is locked before then unlocking the hoop or 2) locking the hoop and confirming it is locked before then unlocking the hook. This also allows for the aircraft to recover to a flyable state by backing out to a previous state when an error occurs. Separating the locks also can make rigging easier, the components no longer relying on each other for proper positioning, and another advantage is that some of the components are removed from centrifugal force considerations.

FIGS. 6A-6G illustrate pitch lock system 601, which comprises a circumferential ring 603 rotatably mounted on mast 605. Ring 603 experiences low loads and may be installed on mast using a PTFE bearing, though roller bearings may alternatively be used. A rotary actuator 607 is fixedly carried in a mount 609 on spinner spoke 610, and an actuator arm 611 is mounted on actuator shaft 613 for causing rotation of arm 611. A drive link 615 couples arm 611 to a boss 617 extending from the outer surface of ring 603, allowing rotation of shaft 613 to cause rotation of ring 603 about mast 605.

To prevent rotation of grip 209 and the associated blade (not shown) about a pitch axis, a hoop lock 619 is pivotably coupled to blade stop 621 with fastener 622 for rotation with mast 605. Lock 619 selectively engages both a blade-stop tab 623 and a grip tab 625 between rollers 627. When lock 619 is rotated into engagement with tabs 623, 625, as shown in FIGS. 6C, 6E, and 6G, tabs 623, 625 are pinched between rollers 627, and this prevents rotation of grip 209 relative to the rotor hub. A hoop link 629 couples a ring arm 631 extending from the outer surface of ring 603 to a lock arm 633 extending from the associated lock 619. Ring 603 comprises one boss 617 and a ring arm 631 for each rotor blade, allowing ring 603 to control the motion of all hoop locks 619 in unison.

Figure 6A:
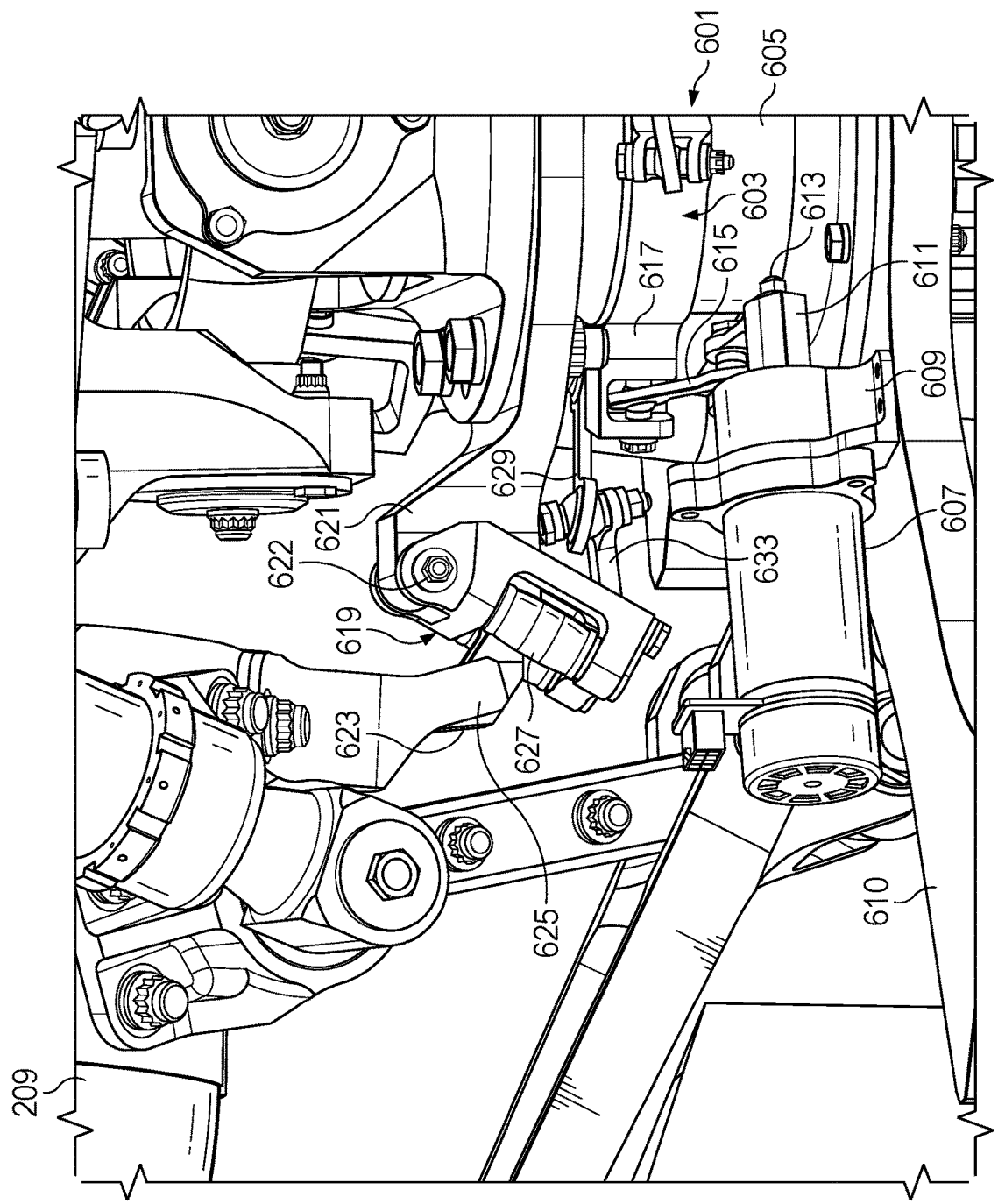
FIGS. 6A-6G illustrate an exemplary pitch-lock system utilizing a mast-mounted ring to move between pitch-locked and pitch-unlocked configurations.
Figure 6B:
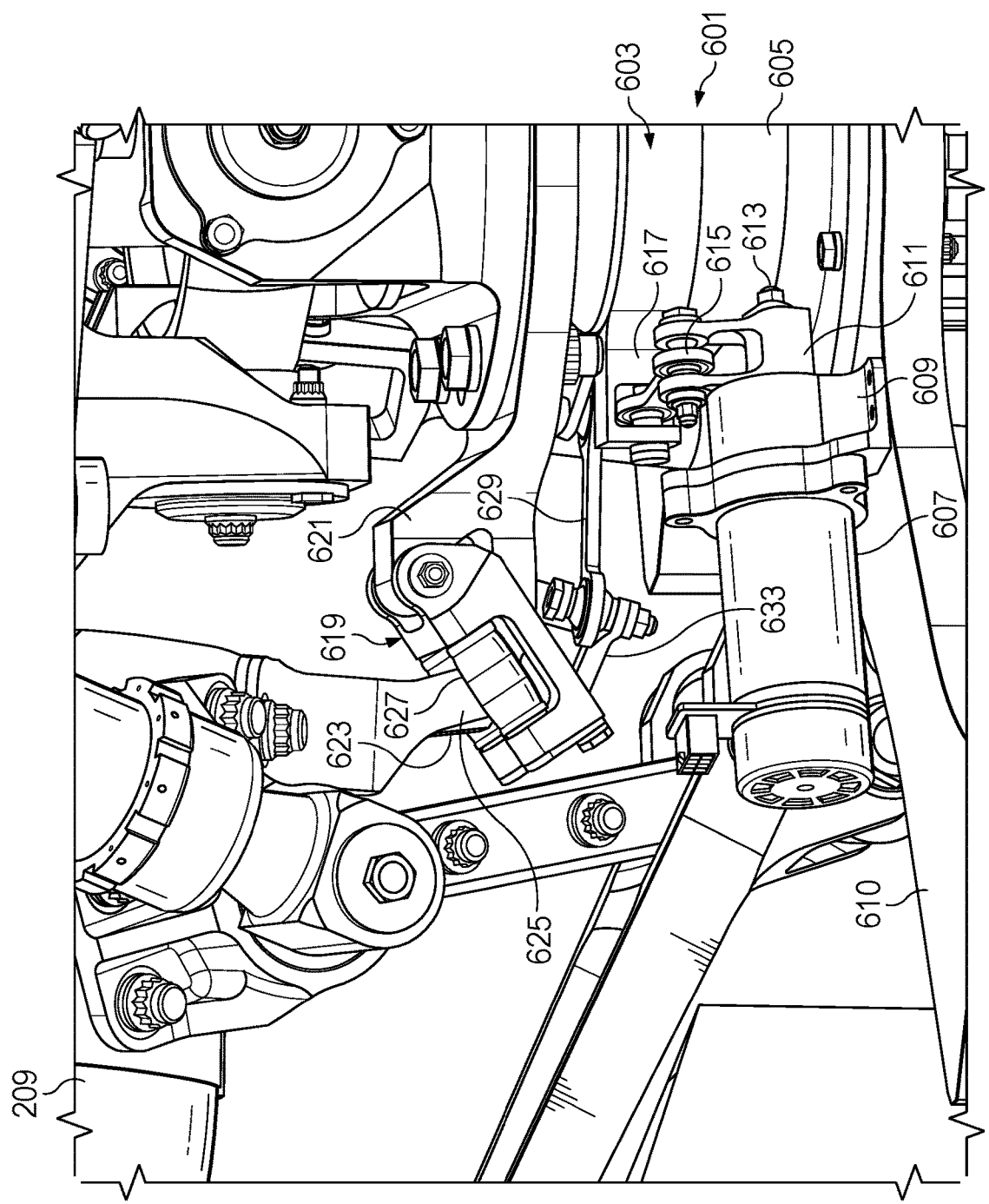
Figure 6C:
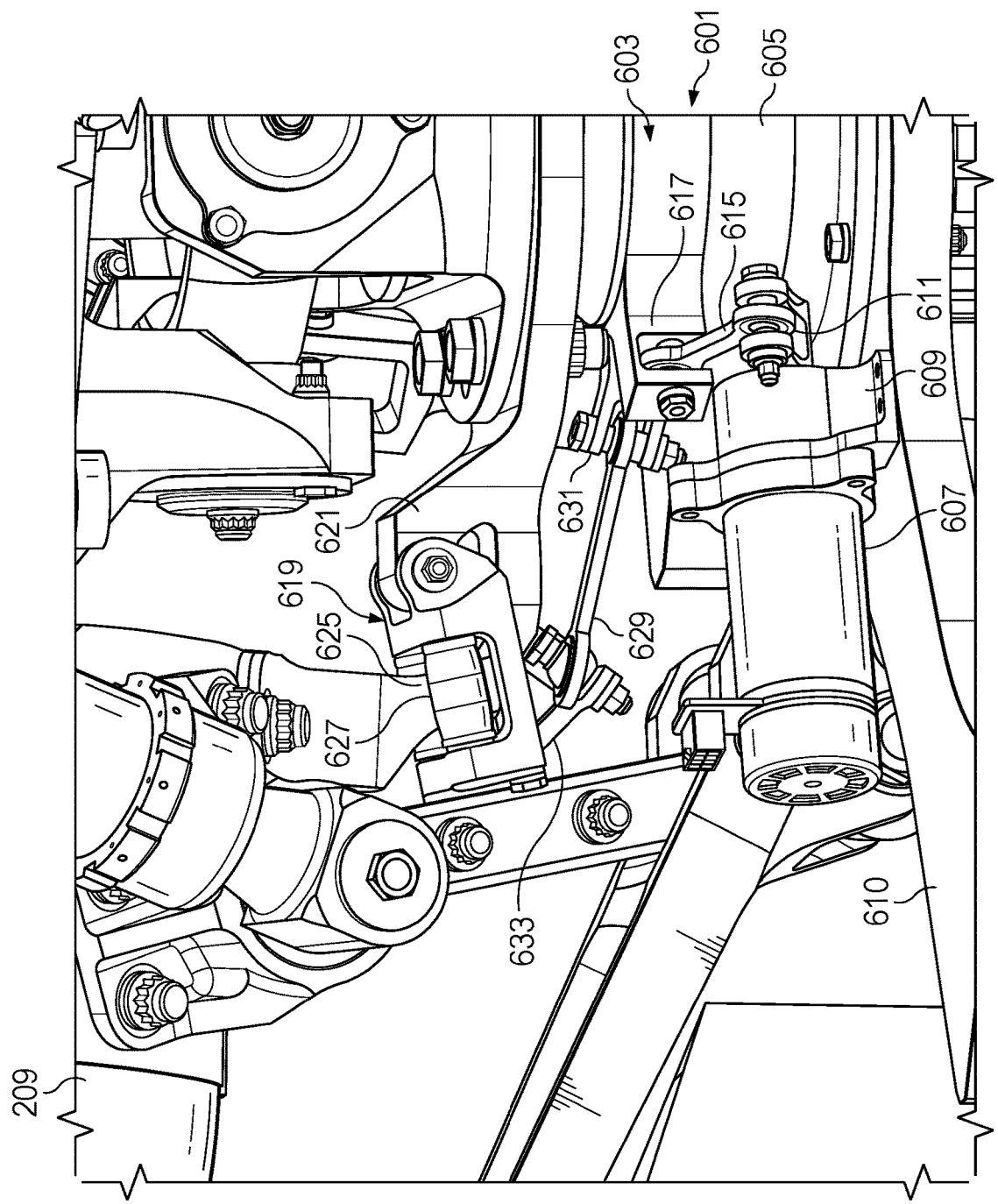

FIGS. 6A-6C illustrate system 601 in the pitch-unlocked configuration (FIG. 6A), a mid-travel configuration (FIG. 6B), and the pitch-lock configuration (FIG. 6C). As actuator 607 rotates shaft 613 and actuator arm 611 from the position shown in FIG. 6A, arm 611 pulls drive link 615, and boss 617 moves toward actuator 607, causing corresponding rotation of ring 603. As ring 603 rotates, ring arm 631 pushes hoop link 629 toward actuator 607, causing hoop lock 619 to rotate in an outboard direction and into engagement with tabs 623, 625, as shown in FIG. 6C.

The overcenter locking of hoop link 629 is illustrated from below in FIGS. 6D and 6E, and the overcenter locking of drive link 615 is illustrated from the side in FIGS. 6F and 6G.

Figure 6D:
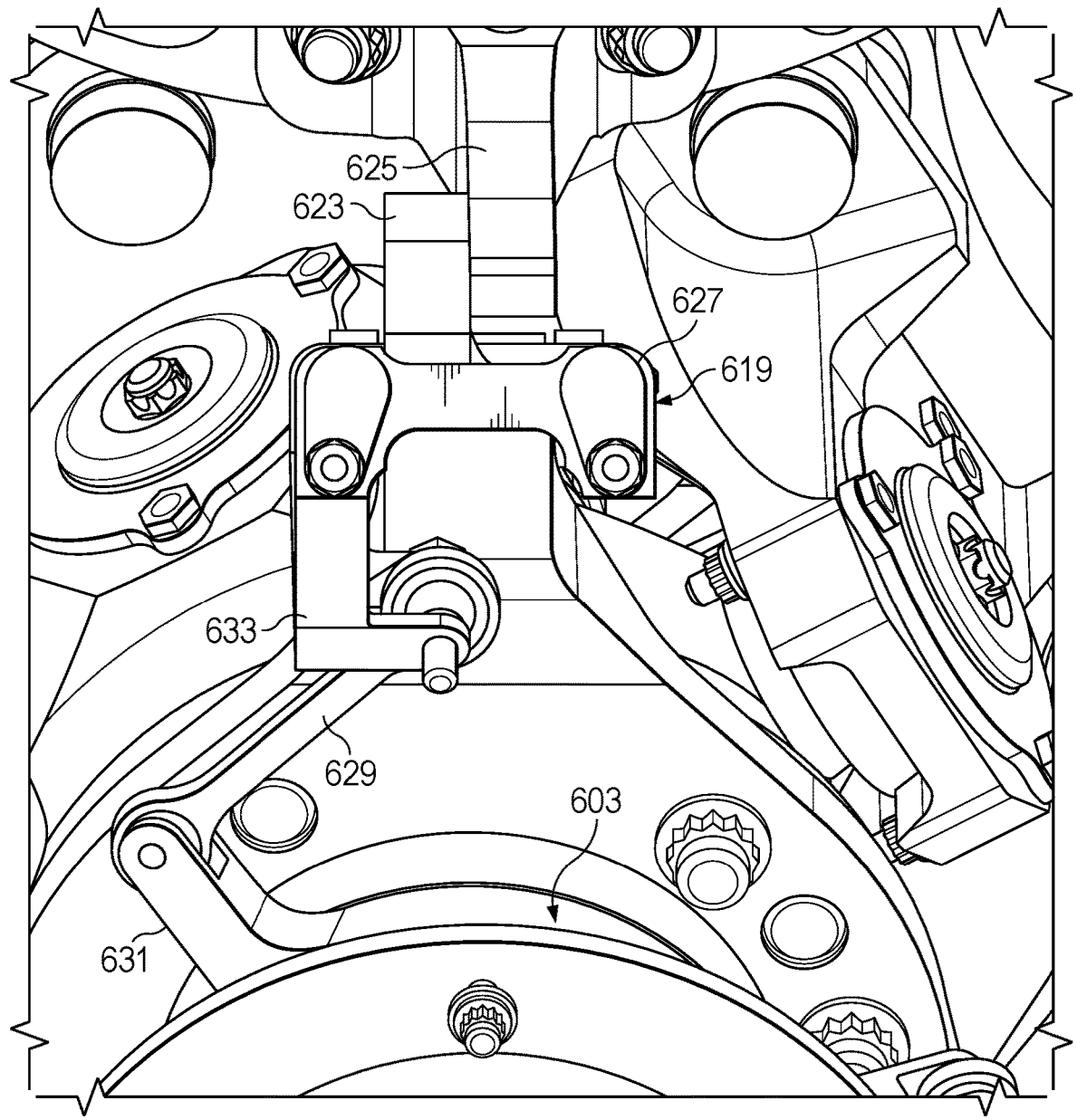
Figure 6E:
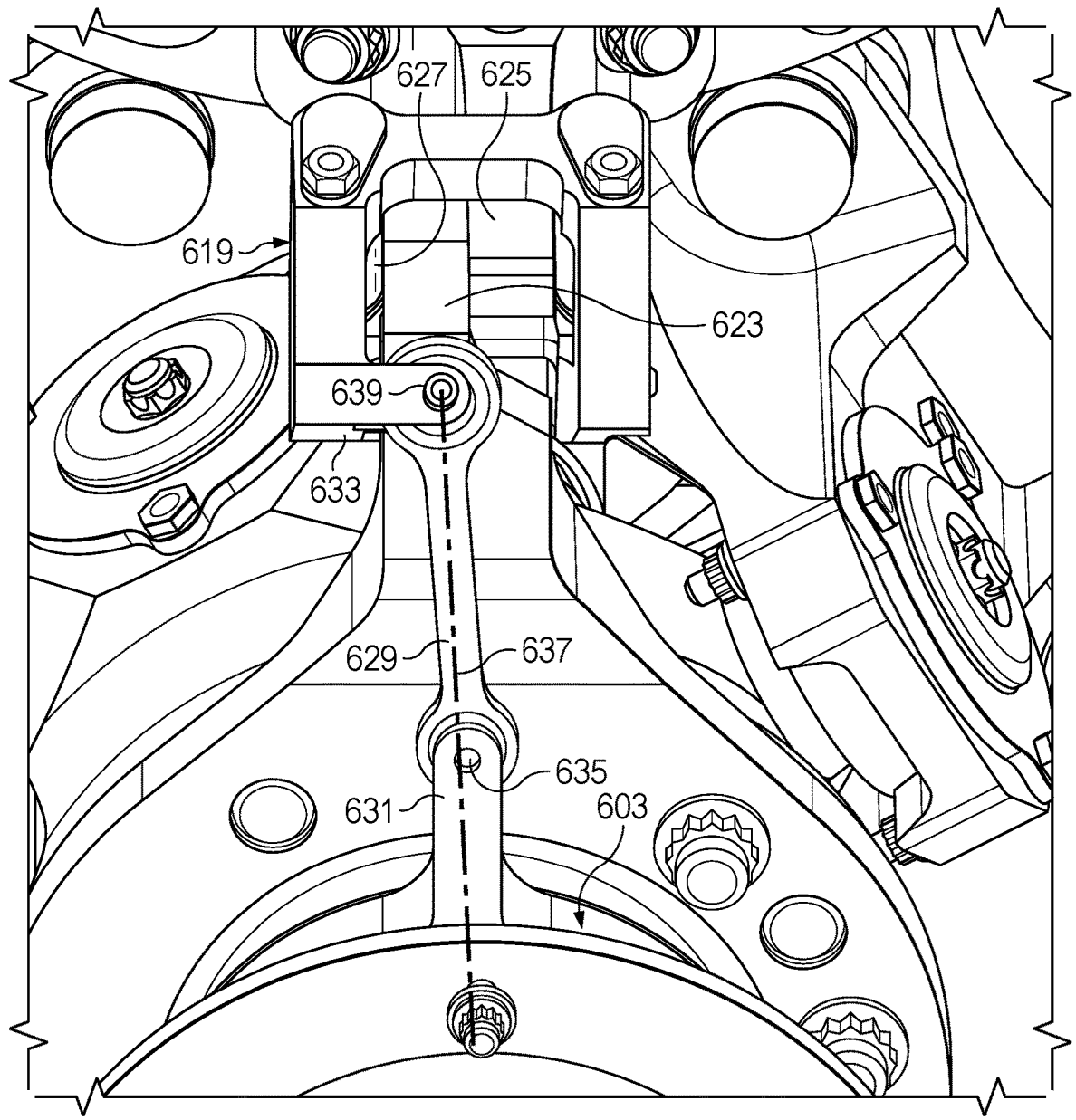

Components of system 601 are shown in the pitch-unlocked configuration in FIG. 6D and in the pitch-lock configuration in FIG. 6E. Passive overcenter locking is achieved in the pitch-lock position when joint 635 coupling arm 631 to hoop link 629 is rotated beyond a line 637 defined by the axis of rotation of ring 603 and joint 639 coupling link 629 to lock arm 633. This provides locking in the pitch-lock configuration without additional locking components.

Figure 6F:
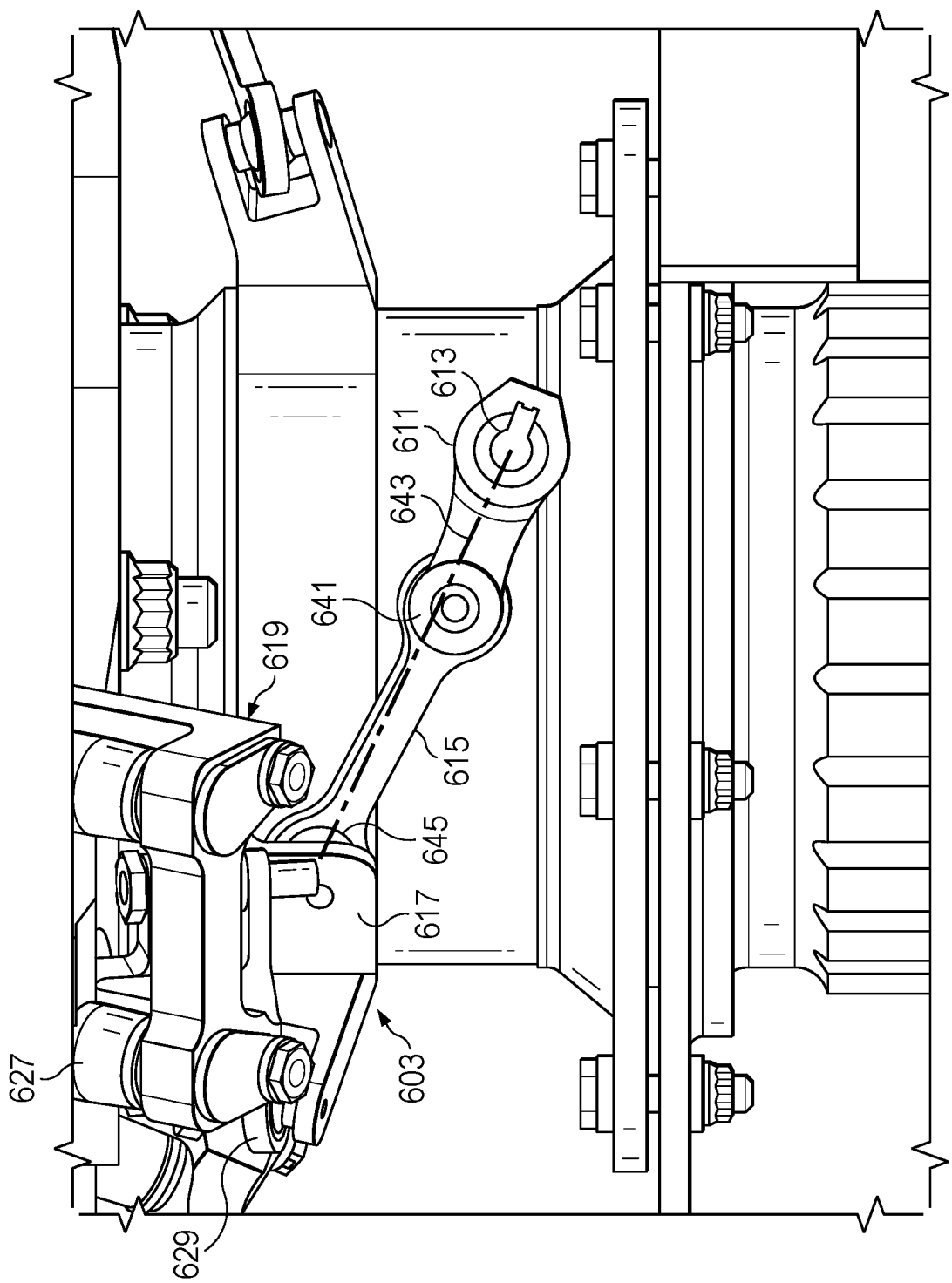
Figure 6G:
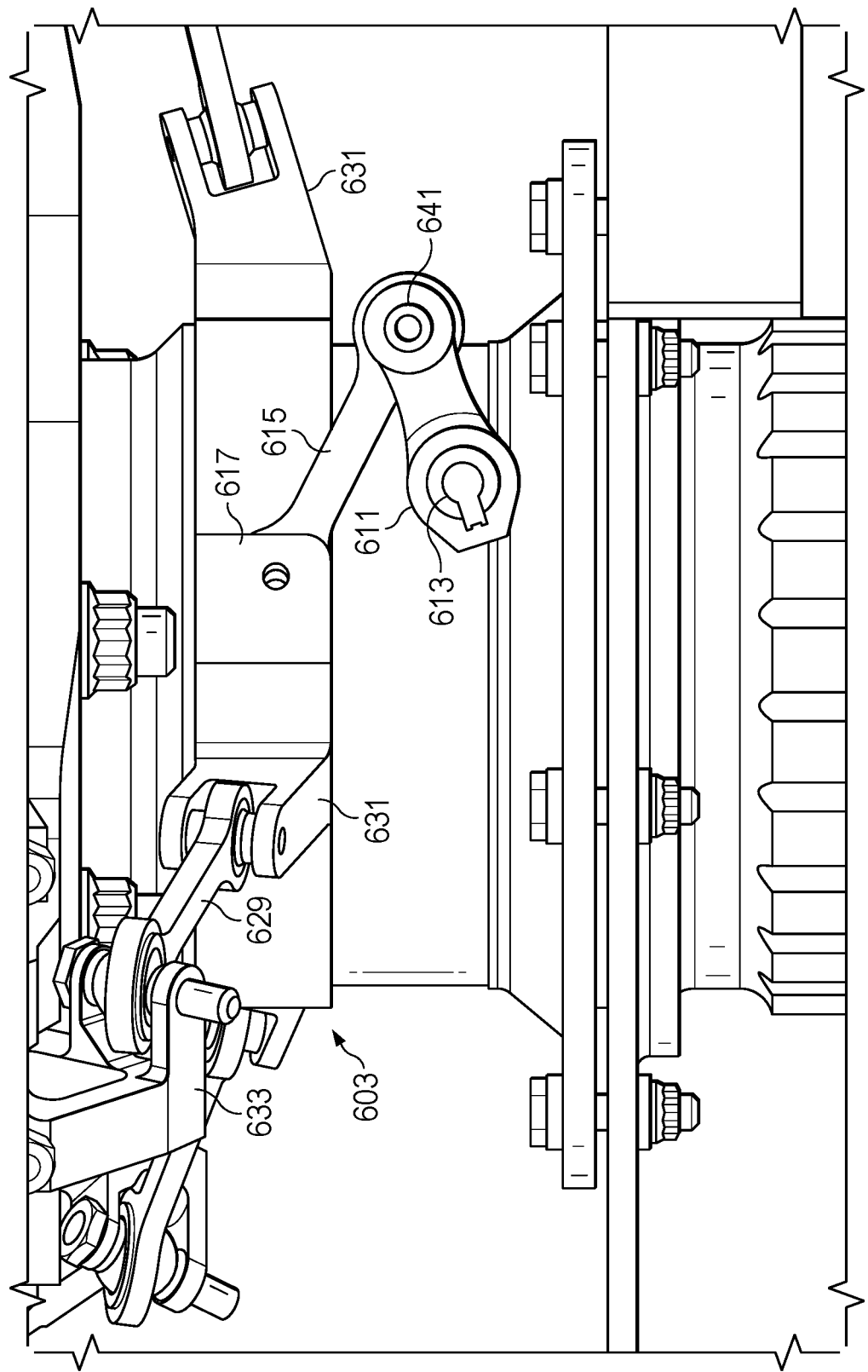

Components of system 601 are shown in the pitch-unlocked configuration in FIG. 6F and in the pitch-lock configuration in FIG. 6G. Passive overcenter locking is achieved in the pitch-unlocked position when joint 641 coupling actuator arm 611 to drive link 615 is rotated beyond a line 643 defined by the axis of rotation of shaft 613 and joint 645 coupling link 615 to boss 617. This provides locking in the pitch-unlocked configuration without additional locking components.

FIGS. 7A-7D illustrate pitch lock system 701, which comprises a circumferential pivot gear 703 rotatably mounted on mast 705. System 701 is similar to system 601, and similar components have similar numbers. Gear 703 experiences low loads and may be installed on mast using a PTFE bearing, though roller bearings may alternatively be used. A rotary actuator 707 is fixedly carried in a mount 709 on spinner spoke 710, and a bevel gear 711 is mounted on an actuator shaft (not shown) for causing rotation of bevel gear 711. Bevel gear 711 meshes with gear teeth 712 of gear 703, and rotation of bevel gear 711 causes rotation of gear 703 about mast 705

To prevent rotation of the associated blade grip and the associated blade (not shown) about a pitch axis, hoop lock 719 is pivotably coupled to blade stop 721 with fastener 723 for rotation with mast 705. Lock 719 selectively engages both blade-stop tab 723 and grip tab 725 between rollers 727. When lock 741 is rotated into engagement with tabs 723, 725, as shown in FIGS. 7B and 7D, tabs 723, 725 are pinched between rollers 727, and this prevents rotation of the grip relative to the rotor hub. A hoop link 729 couples a clevis 731 extending from an outer surface of gear 703 to lock 719. Gear 703 comprises a clevis 731 for each rotor blade, allowing gear 703 to control the motion of all hoop locks 719 in unison.

Figure 7A:
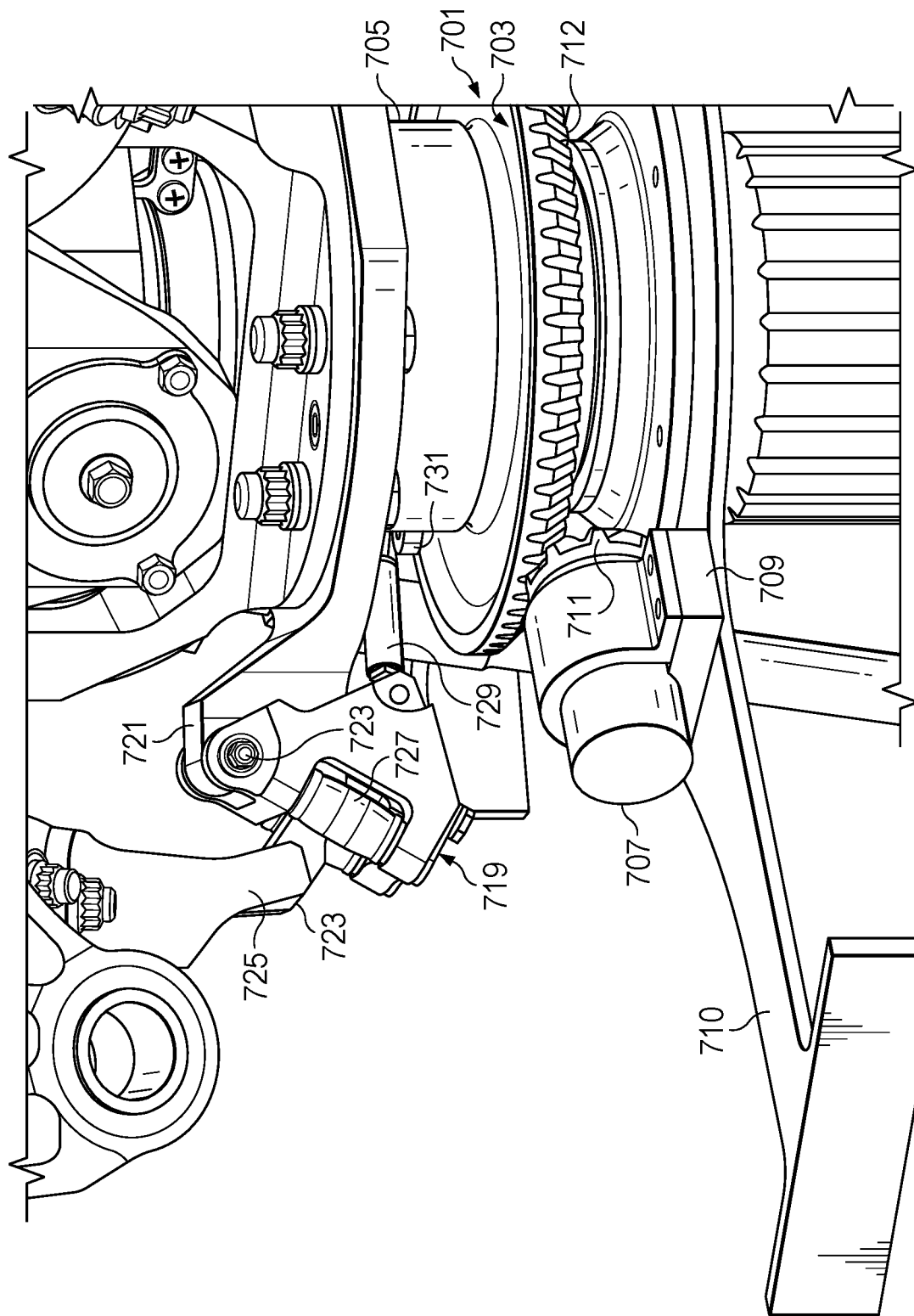
FIGS. 7A-7D illustrate an exemplary pitch-lock system utilizing a mast-mounted geared ring to move between pitch-locked and pitch-unlocked configurations.
Figure 7B:
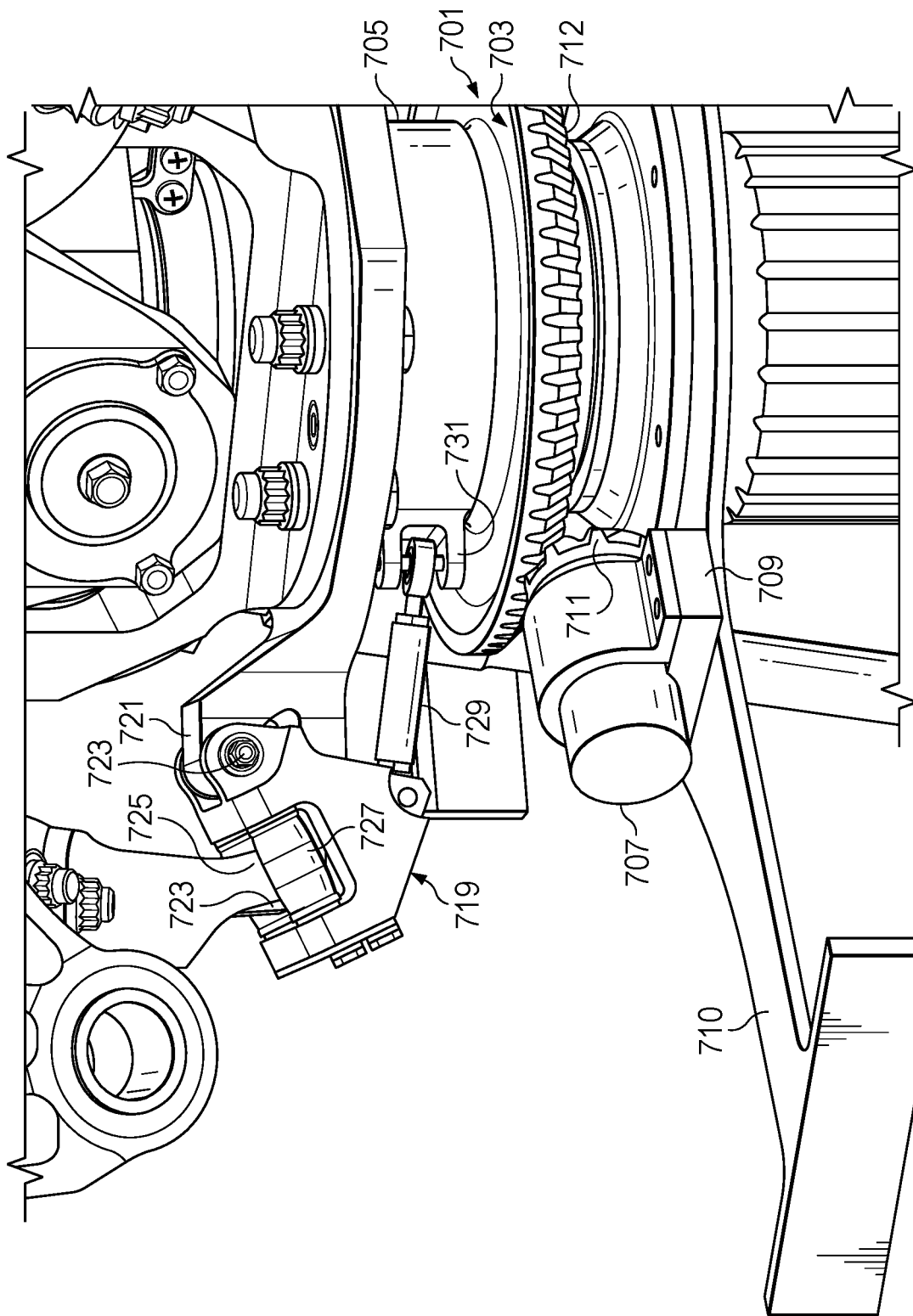

FIGS. 7A and 7B illustrate system 701 in the pitch-unlocked configuration (FIG. 7A) and the pitch-lock configuration (FIG. 7B). As actuator 707 rotates bevel gear 711 and pivot gear 703 from the position shown in FIG. 6A, clevis 731 moves toward actuator 707, pushing hoop link 729 toward actuator 707, causing hoop lock 719 to rotate in an outboard direction and into engagement with tabs 723, 725, as shown in FIG. 7B.

The overcenter locking of hoop link 729 is illustrated from below in FIGS. 7C and 7D.

Figure 7C:
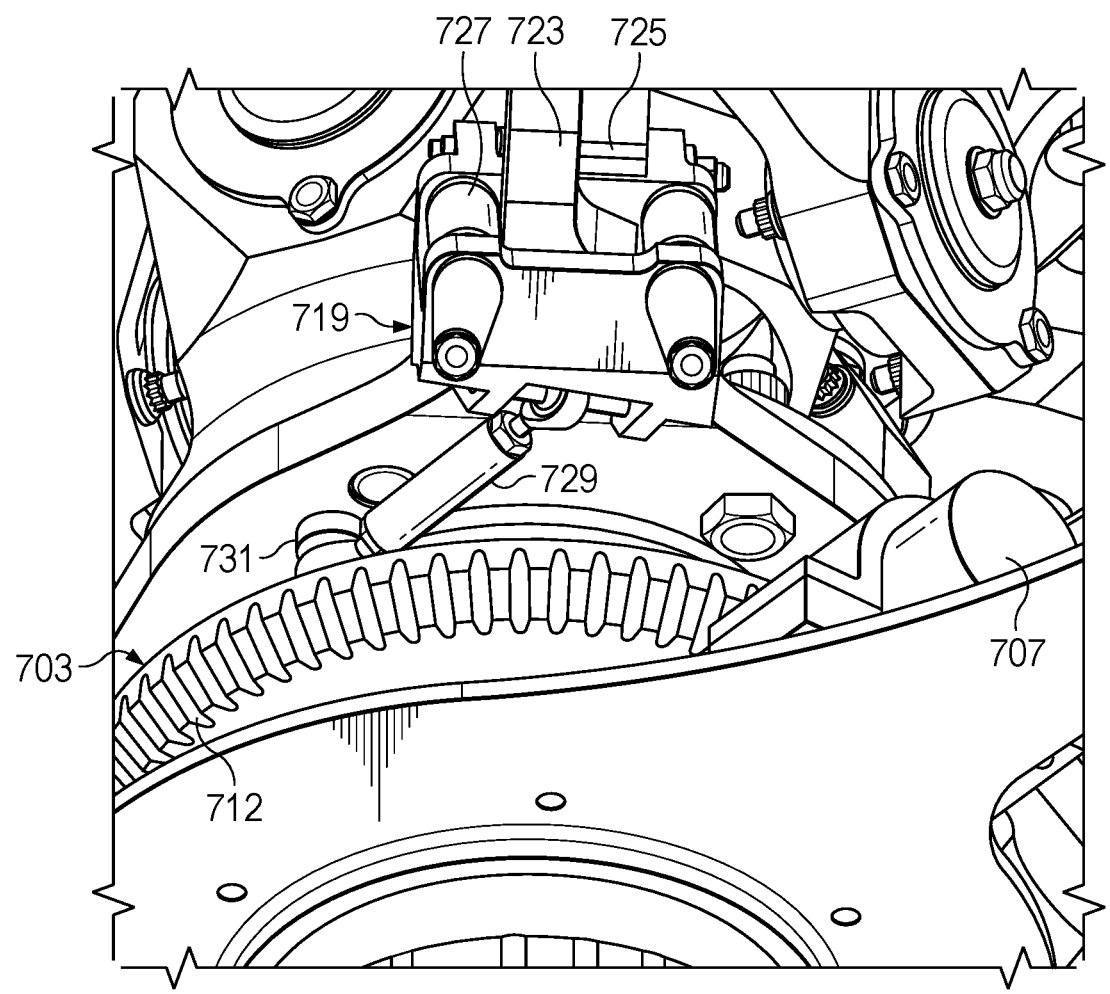
Figure 7D:
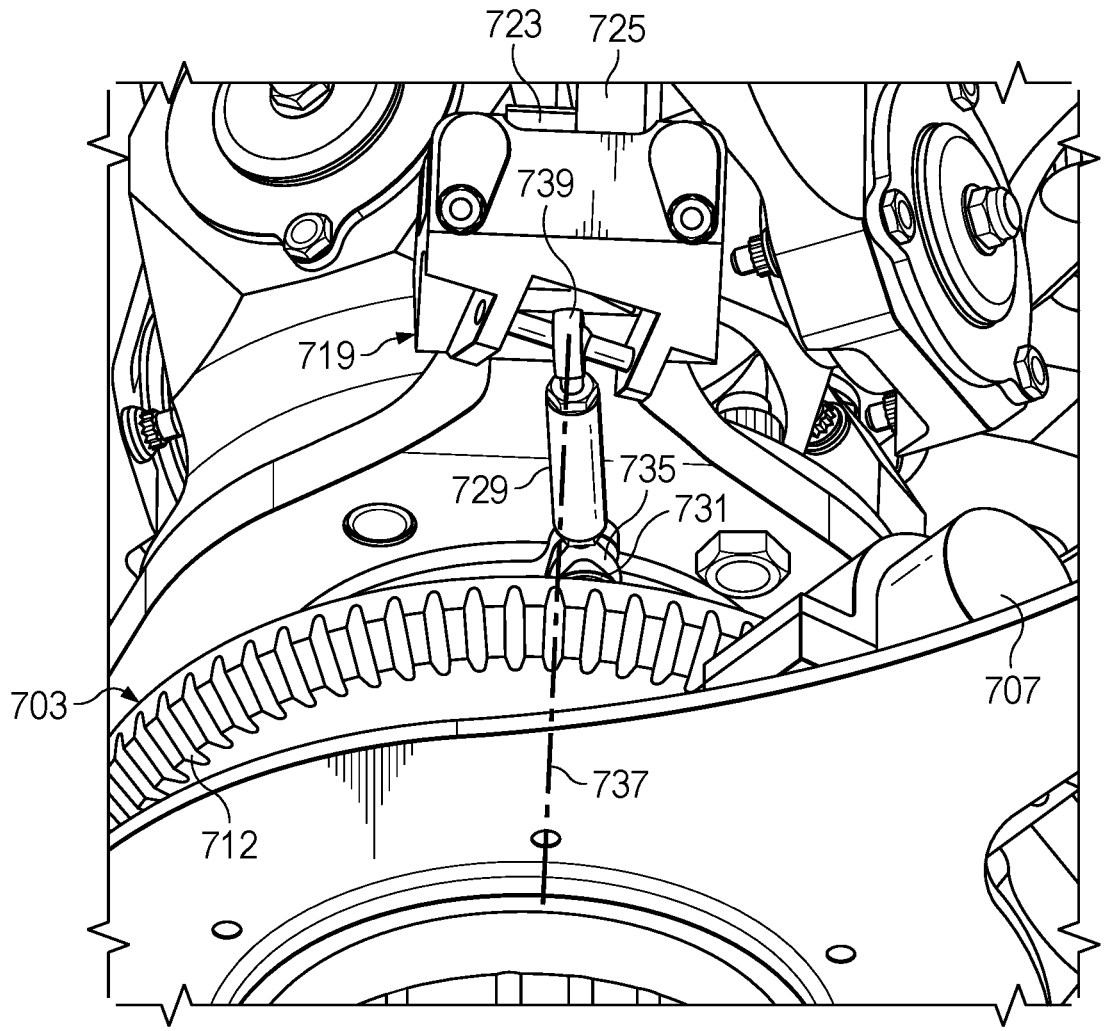

Components of system 701 are shown in the pitch-unlocked configuration in FIG. 7C and in the pitch-lock configuration in FIG. 7D. Passive overcenter locking is achieved in the pitch-lock position when joint 735 coupling clevis 731 to hoop link 729 is rotated beyond a line 737 defined by the axis of rotation of ring 703 and joint 739 coupling link 729 to lock 719. This provides locking in the pitch-lock configuration without additional locking components. No overcenter locking occurs in the pitch-unlocked configuration, and an actuator brake is needed to prevent uncommanded motion away from the pitch-unlocked configuration.

System 701 provides additional mechanical advantage through the gear ratio between pivot gear 703 and bevel gear 711, and this can allow for use of a smaller actuator 707 than those required for system 601. An alternative embodiment of system 701 employs a worm gear rotated by actuator 707 to drive pivot gear 703. This would require reorienting actuator 707 or using a 90-degree drive coupling to properly orient the output gear meshed with pivot gear 703, but use of a worm gear would eliminate the need for an actuator brake and may eliminate the need for overcenter locking.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A rotor-blade assembly having a lock system to enable and disable a folding degree of freedom and a pitching degree of freedom of a rotor blade, the system comprising:
   a blade grip coupled to a hub, the blade grip being rotatable relative to the hub about a pitch axis;
   a rotor blade coupled to the blade grip, the blade being pivotable about a fold axis relative to the grip, the blade and grip being pivotable together about the pitch axis;
   a fold lock that prevents folding of the blade in a fold-lock position and allows folding of the blade in a pitch-lock position;
   a pitch lock that allows pitch movement of the rotor blade in the fold-lock position and prevents pitch movement of the rotor blade in the pitch-lock position; and
   a rotary actuator carried by the grip and having an actuator arm;
   a linkage comprising a first link and a second link, each link having opposing ends, the first link pivotably connected at one end to the actuator arm and pivotably connected at its opposing end to the fold lock, and the second link pivotably connected at one end to the pitch lock and pivotably connected at its opposing end to the actuator arm;
   wherein the actuator is configured for moving the pitch lock and the fold lock between the fold-lock and pitch-lock positions.

2. The rotor-blade assembly of claim 1, wherein the actuator is carried in a bolt coupling the blade to the hub.

3. The rotor-blade assembly of claim 1, wherein the actuator is carried on a leading portion of the grip.

4. The rotor-blade assembly of claim 1, wherein the actuator is carried on a trailing portion of the grip.

5. The rotor-blade assembly of claim 1, wherein the linkage provides passive, overcenter locking in the pitch-lock position.

6. The rotor-blade assembly of claim 1, wherein the linkage provides passive, overcenter locking in the fold-lock position.

7. The rotor-blade assembly of claim 1, further comprising:
   a blade-fold link coupled to the rotor blade, wherein the fold lock enables and disables the folding degree of freedom by unlocking and locking the blade-fold link.

8. The rotor-blade assembly of claim 1, further comprising:
   a blade-stop tab;
   wherein the pitch lock enables and disables the pitching degree of freedom by engaging and disengaging the blade-stop tab.

9. A rotor-blade assembly having a lock system to enable and disable a folding degree of freedom and a pitching degree of freedom of a rotor blade, the system comprising:
   a blade grip coupled to a hub, the blade grip being rotatable relative to the hub about a pitch axis;
   a rotor blade coupled to the blade grip, the blade being pivotable about a fold axis relative to the grip, the blade and grip being pivotable together about the pitch axis;
   a fold lock that prevents folding of the blade in a fold-lock position and allows folding of the rotor blade in a pitch-lock position;
   a pitch lock that allows pitch movement of the rotor blade in the fold-lock position and prevents pitch movement of the rotor blade in the pitch-lock position; and
   a rotary actuator carried in a bolt coupling the blade to the hub and having an actuator arm;
   a linkage comprising a first link and a second link, each link having opposing ends, the first link pivotably connected at one end to the actuator arm and pivotably connected at its opposing end to the fold lock, and the second link pivotably connected at one end to the pitch lock and pivotably connected at its opposing end to the actuator arm;
   wherein the actuator is configured for moving the pitch lock and the fold lock between the fold-lock and pitch-lock positions.

10. The rotor-blade assembly of claim 9, wherein the linkage provides passive, overcenter locking in the pitch-lock position.

11. The rotor-blade assembly of claim 9, wherein the linkage provides passive, overcenter locking in the fold-lock position.

12. The rotor-blade assembly of claim 9, further comprising:
    a blade-fold link coupled to the rotor blade, wherein the fold lock enables and disables the folding degree of freedom by unlocking and locking the blade-fold link.

13. The rotor-blade assembly of claim 9, further comprising:
    a blade-stop tab;
    wherein the pitch lock enables and disables the pitching degree of freedom by engaging and disengaging the blade-stop tab.

14. The rotor-blade assembly of claim 9, further comprising:
    a second actuator carried on a leading portion of the grip and coupled to at least one actuator arm, the second actuator being configured for moving the pitch lock and the fold lock between the fold-lock and pitch-lock positions.

15. The rotor-blade assembly of claim 9, further comprising:
    a second actuator carried on a trailing portion of the grip and coupled to at least one actuator arm, the second actuator being configured for moving the pitch lock and the fold lock between the fold-lock and pitch-lock positions.

16. A rotor assembly having a lock system to enable and disable a pitching degree of freedom of a rotor blade, the system comprising:
    a rotor mast rotatable about a mast axis;
    a rotor blade coupled to the mast for rotation therewith about the mast axis, the blade also being rotatable relative to the mast about a pitch axis;
    a pitch lock that allows pitch movement of the rotor blade in an unlock position and prevents pitch movement of the rotor blade in a lock position;
    a ring carried by the mast and rotatable relative to the mast about the mast axis, a lock linkage coupling the ring to the pitch lock;
    an actuator configured for rotating the ring about the mast axis;
    wherein operation of the actuator rotates the ring about the mast axis for moving the pitch lock between the lock and unlock positions.

17. The rotor assembly of claim 16, wherein the lock linkage provides passive, overcenter locking in the lock position.

18. The rotor assembly of claim 16, wherein a ring linkage couples the actuator to the ring.

19. The rotor assembly of claim 18, wherein the ring linkage provides passive, overcenter locking in the unlock position.

20. The rotor assembly of claim 16, wherein the ring comprises gear teeth and the actuator comprises a gear engaged with the teeth.

* * * * *